United States Patent
Ramasubramonian et al.

(10) Patent No.: US 11,153,579 B2
(45) Date of Patent: Oct. 19, 2021

(54) DERIVING DYNAMIC RANGE ADJUSTMENT (DRA) PARAMETERS FOR VIDEO CODING

(71) Applicant: QUALCOMM Incorporated, San Diego, CA (US)

(72) Inventors: Adarsh Krishnan Ramasubramonian, Irvine, CA (US); Dmytro Rusanovskyy, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/360,971

(22) Filed: Mar. 21, 2019

(65) Prior Publication Data

US 2019/0297337 A1    Sep. 26, 2019

Related U.S. Application Data

(60) Provisional application No. 62/647,472, filed on Mar. 23, 2018.

(51) Int. Cl.
| | | |
|---|---|---|
| *H04N 19/186* | (2014.01) | |
| *H04N 19/70* | (2014.01) | |
| *H04N 19/124* | (2014.01) | |
| *H04N 19/98* | (2014.01) | |
| *H04N 19/85* | (2014.01) | |

(52) U.S. Cl.
CPC ......... *H04N 19/186* (2014.11); *H04N 19/124* (2014.11); *H04N 19/70* (2014.11); *H04N 19/85* (2014.11); *H04N 19/98* (2014.11)

(58) Field of Classification Search
CPC .... H04N 19/85; H04N 19/186; H04N 19/124; H04N 19/70; H04N 19/98; H04N 19/174
See application file for complete search history.

(56) References Cited

U.S. PATENT DOCUMENTS

2016/0309154 A1* 10/2016 Rusanovskyy ...... H04N 19/186

FOREIGN PATENT DOCUMENTS

WO    WO-2019040502 A1    2/2019

OTHER PUBLICATIONS

International Search Report and Written Opinion—PCT/US2019/023703—ISA/EPO—dated Jun. 28, 2019.
(Continued)

*Primary Examiner* — Obafemi O Sosanya

(57) ABSTRACT

Dynamic Range Adjustment can be used to correct distortions that can occur when the dynamic range of the colors in video are transformed. In various examples, Dynamic Range Adjustment can be performed using a function without discontinuities that takes as input a range of color values. Parameters describing the function can be encoded into a bitstream, and the parameters can be used by a decoding process to reconstruct the function. The function can be linear or non-linear. The function optionally includes a piece-wise linear function.

21 Claims, 14 Drawing Sheets

(56) References Cited

OTHER PUBLICATIONS

Ramasubramonian A.K., et al., "Additional Information on HDR Video Coding Technology Proposal by Qualconm and Technicolor", 10.JVET Meeting, Oct. 4, 2018-20-4-2018; San Diego; (The Joint Video Exploration Team of ISO/IEC JTC1/SC29/WG11 and ITU-TSG.16), URL: http://phenix.int-evry.fr/jvet/ No. JVET-J0067, Apr. 3, 2018 (Apr. 3, 2018), pp. 1-7, XP030151258, Abstract, Sections 1-2, pp. 1-2.

Sullivan G.J., et al., "Overview of the High Efficiency Video Coding (HEVC) Standard", IEEE Transactions On Circuits And Systems For Video Technology, vol. 22, No. 12, Dec. 1, 2012 (Dec. 1, 2012), XP055388661, USA ISSN: 1051-8215, DOI: 10.1109/TCSVT.2012. 2221191, pp. 1649-1668, p. 1662, Paragraph 3) Merge Mode.

* cited by examiner

DERIVING DYNAMIC RANGE ADJUSTMENT (DRA) PARAMETERS FOR VIDEO CODING

CLAIM OF PRIORITY UNDER 35 U.S.C. § 119

The present Application for Patent claims priority to Provisional Application No. 62/647,472, filed Mar. 23, 2018 and assigned to the assignee hereof and hereby expressly incorporated by reference herein.

BACKGROUND

Field

This application is related to video systems and methods. For example, this application is related to the field of coding of video signals with High Dynamic Range (HDR) and Wide Color Gamut (WCG) representations. The application specifies signaling and operations applied to video data in certain color spaces to enable more efficient compression of HDR and WCG video data. Benefits of the subject matter of this application include improving the compression efficiency of hybrid based video coding systems utilized for coding HDR and WCG video data.

Background

Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, a video coding standard, namely High Efficiency Video Coding (HEVC), has been developed by the Joint Collaboration Team on Video Coding (JCT-VC) of ITU-T Video Coding Experts Group (VCEG) and ISO/IEC Motion Picture Experts Group (MPEG). The latest HEVC draft specification is available as "Recommendation ITU-T H.265: High Efficiency Video Coding (HEVC)," http://www.itu.int/rec/T-REC-H.265-201504-I/en. In addition to improved coding efficiency, a need exists for video codecs that have further support for HDR and WCD representations.

SUMMARY

In various implementations, provided are systems such as encoding and decoding devices, methods, and computer-readable medium for encoding and decoding video data.

One embodiment includes a method of encoding video data, the method includes obtaining, at an encoding device, video data. For a portion of a video picture of the video data, the video data includes parameters describing a function of a quantization parameter that is without discontinuities. The function defines a dynamic range adjustment of colors in the portion of the video frame. The quantization factor is associated with the portion of the picture. The method further includes generating a syntax structure indicative of the parameters and generating encoded video data from the video data. The syntax structure is included with the encoded video data.

One embodiment includes a method of decoding video data. The method includes determining, from an encoded video bitstream comprising encoded video data, for a portion of a video picture from the encoded video data, a syntax structure including parameters describing a function of a quantization parameter that is without discontinuities for dynamic range adjustment of colors in the portion of the video picture. The quantization factor is associated with the portion of the picture. The method further includes decode the video picture using the encoded video data and applying the function to samples in the portion of the video picture to perform dynamic range adjustment.

Another embodiment includes an apparatus for encoding video data. The apparatus includes a memory configured to store at least a portion of a video picture and a video processor. The video processor is configured to obtain video data and, for a portion of a video picture of the video data, the obtained video data includes parameters describing a function of a quantization parameter that is without discontinuities. The function defines a dynamic range adjustment of colors in the portion of the video frame. The quantization factor is associated with the portion of the picture. The video processor is further configured to generate a syntax structure indicative of the parameters and generate encoded video data from the video data. The syntax structure is included with the encoded video data.

Another embodiment includes an apparatus for decoding video data. The apparatus includes a memory configured to store at least a portion of a video picture and a video processor. The video processor is configured to determine, from an encoded video bitstream comprising encoded video data, for the portion of the video picture from the encoded video data, a syntax structure including parameters describing a function of a quantization factor, the function being without discontinuities for dynamic range adjustment of colors in the portion of the video picture. The quantization parameter is associated with the portion of the picture. The processor is further configured to decode the video picture using the encoded video data and to apply the function to samples in the portion of the video picture to perform dynamic range adjustment.

Another embodiment includes an apparatus for decoding video data. The apparatus includes means for storing at least a portion of a video picture and means for processing video data. The means for processing video data includes means for determining, from an encoded video bitstream comprising encoded video data, for the portion of the video picture from the encoded video data, a syntax structure including parameters describing a function of a quantization parameter, the function being without discontinuities for dynamic range adjustment of colors in the portion of the video picture. The quantization parameter is associated with the portion of the picture. The means for processing video data further includes means for decoding the video picture using the encoded video data and means for applying the function to samples in the portion of the video picture to perform dynamic range adjustment.

Another embodiment includes an apparatus for encoding video data. The apparatus includes means for storing at least a portion of a video picture and means for processing video data. The means for processing video data includes means for obtaining video data and, for a portion of a video picture of the video data, the obtained video data includes parameters describing a function of a quantization parameter that is without discontinuities. The function defines a dynamic range adjustment of colors in the portion of the video frame. The quantization factor is associated with the portion of the picture. The means for processing video data further comprises means for generating a syntax structure indicative of the parameters and means for generating encoded video data from the video data. The syntax structure is included with the encoded video data.

Another embodiment includes a non-transitory computer readable medium having stored thereon instructions that when executed cause a processor. The instructions further cause the processor to obtain video data and, for a portion of a video picture of the video data, the obtained video data includes parameters describing a function of a quantization parameter that is without discontinuities. The function defines a dynamic range adjustment of colors in the portion of the video frame. The quantization factor is associated with the portion of the picture. The instructions further cause the processor to generate a syntax structure indicative of the parameters and generate encoded video data from the video data. The syntax structure is included with the encoded video data.

Another embodiment includes a non-transitory computer readable medium having stored thereon instructions that when executed cause a processor to store at least a portion of a video picture and a video processor. The instructions further cause the processor to determine, from an encoded video bitstream comprising encoded video data, for the portion of the video picture from the encoded video data, a syntax structure including parameters describing a function of a quantization factor, the function being without discontinuities for dynamic range adjustment of colors in the portion of the video picture. The quantization parameter is associated with the portion of the picture. The instructions further cause the processor to decode the video picture using the encoded video data and to apply the function to samples in the portion of the video picture to perform dynamic range adjustment.

DETAILED DESCRIPTION

Dynamic Range Adjustment (DRA) can be used to correct distortions that can occur when the dynamic range of the colors in video are transformed. In some forms of DRA, parameters and functions applied as part of DRA may be based on chroma QP terms having integer values that result in the scale functions that feature discontinuities such as in the form of stair-like functions. These discontinuities can create visually apparent artifacts.

In various examples, DRA can be performed using a function without discontinuities that takes as input a range of color values or samples. Such functions can include logarithmic functions of DRA components derived from integer QP parameters to avoid discontinuities in the applied DRA function. Parameters describing the function can be encoded into a bitstream, and the parameters can be used by a decoder to reconstruct the continuous function. Such functions can be linear or non-linear. Such functions can be defined in a piecewise function or otherwise such that the function is without discontinuities.

Dynamic Range Adjustment can be used to improve the efficiency of compression of video data. For example, process can be performed at an encoding device that converts video data into a format that may be more suitable for compression, such that fewer bits may be necessary to encode the video data without affecting the quality of the decoded video data. An inverse process can be performed at a decoding device that converts the data back to the same format as the input video data.

Dynamic Range Adjustment can further be used to convert the video data into a representation that is suitable for a particular type of display. The characteristics of a display, to which the representation can be convert, can include, for example, the peak luminance of the display, the dynamic range of the display, the color gamut of the display, and/or the color primaries used by the display. In some examples, Dynamic Range Adjustment may be used to convert video data from SDR to HDR, or vice versa, as may be applicable.

Figure 1:
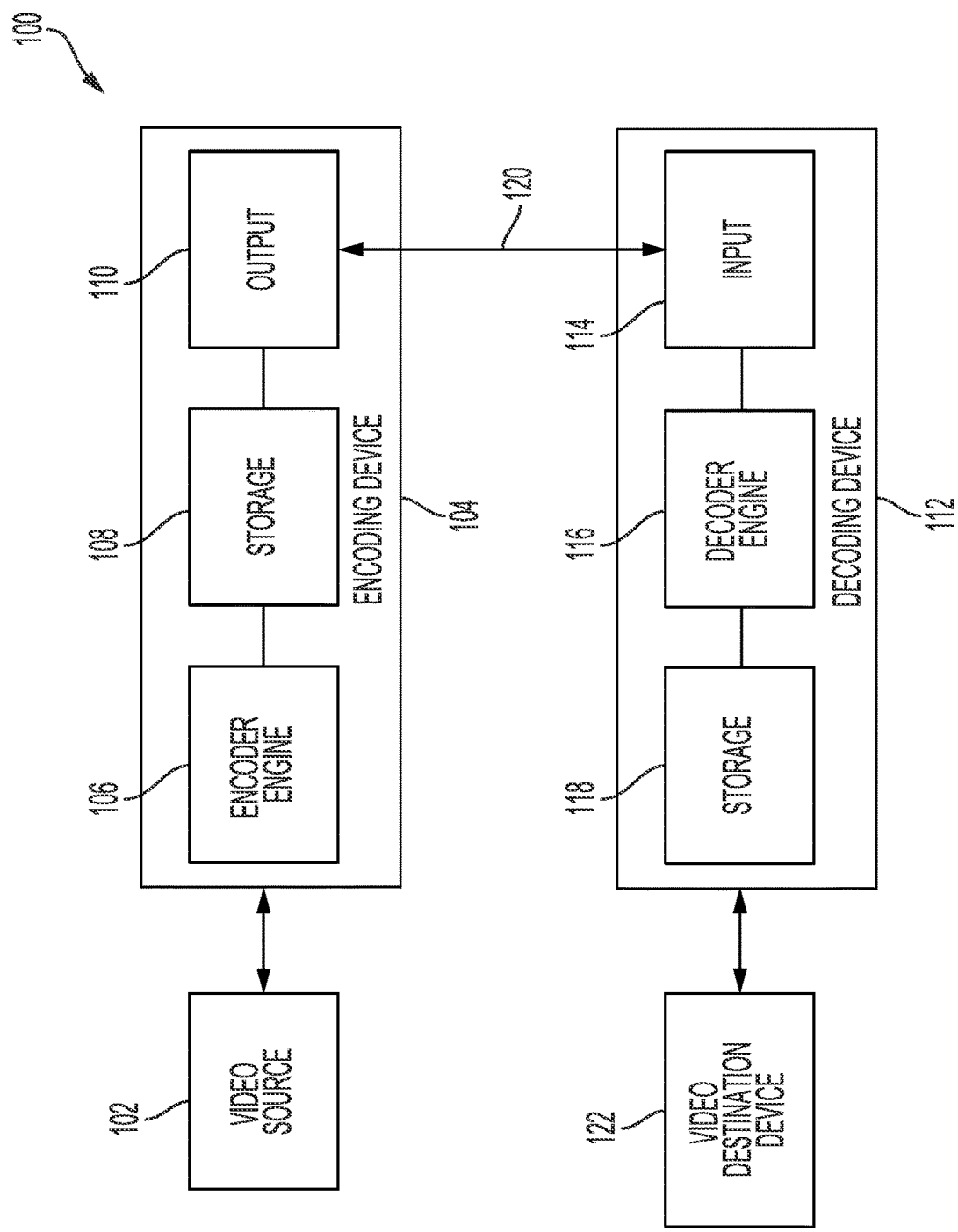
FIG. 1 includes a block diagram illustrating a system that includes an encoding device and a decoding device.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame of a video is a still image of a scene. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

As one example, according to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector (Ax), a vertical component of the motion vector (Ay), a resolution for the motion vector (e.g., integer precision, one-quarter pixel precision, or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or the like) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some examples following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units including VCL NAL units and non-VCL NAL units. VCL NAL units include coded picture data forming a coded video bitstream. For example, a sequence of bits forming the coded video bitstream is resent in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence.

Pictures in a coded video sequence may use the same SPS. The VPS includes information that applies to all layers within a coded video sequence or bitstream. The VPS includes a syntax structure with syntax elements that apply to entire coded video sequences. In some examples, the VPS, SPS, or PPS may be transmitted in-band with the encoded bitstream. In some examples, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some examples, an SEI message can be signaled separately from the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFiTM, radio frequency (RF), UWB, WiFi-Direct, cellular, Long-Term Evolution (LTE), WiMaxTM, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video data may be modulated according to a communication standard, such as a wireless communication protocol, and transmitted to the receiving device.

In some examples, the encoding device 104 may store encoded video data in storage 108. The output 110 may retrieve the encoded video data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116 or to storage 118 for later use by the decoder engine 116. The decoder engine 116 may decode the encoded video bitstream data by entropy decoding (e.g., using an entropy decoder) and extracting the elements of the one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 13. An example of specific details of the decoding device 112 is described below with reference to FIG. 14.

Various standards have also been defined that describe the colors in a captured video, including the contrast ratio (e.g., the brightness or darkness of pixels in the video) and the color accuracy, among other things. Color parameters can be used, for example, by a display device that is able to use the color parameters to determine how to display the pixels in the video. One example standard from the International Telecommunication Union (ITU), ITU-R Recommendation BT.709 (referred to herein as "BT.709"), defines a standard for High-Definition Television (HDTV). Color parameters defined by BT.709 are usually referred to as Standard Dynamic Range (SDR) and standard color gamut. Another example standard is ITU-R Recommendation BT.2020 (referred to herein as "BT.2020"), which defines a standard for Ultra-High-Definition Television (UHDTV). The color parameters defined by BT.2020 are commonly referred to as High Dynamic Range (HDR) and Wide Color Gamut (WCG). Dynamic range and color gamut are referred to herein collectively as color volume.

Next generation video applications are anticipated to operate with video data representing captured scenery with HDR and WCG. Parameters of the utilized dynamic range and color gamut are two independent attributes of video content, and their specification for purposes of digital television and multimedia services are defined by several international standards. For example, as noted above, BT.709 defines parameters for HDTV, such as SDR and standard color gamut, and BT. 2020 specifies UHDTV parameters such as HDR and wide color gamut. There are also other standards development organizations documents specifying these attributes in other systems, e.g. P3 color gamut is defined in SMPTE-231-2 and some parameters of HDR are defined STMPTE-2084.

Dynamic range can be defined as the ratio between the minimum and maximum brightness of a video signal. Dynamic range can also be measured in terms of f-stops. For instance, in cameras, an f-stop is the ratio of the focal length of a lens to the diameter of camera's aperture. One f-stop can correspond to a doubling of the dynamic range of a video signal. As an example, MPEG defines HDR content as content that features brightness variations of more than 16 f-stops. In some examples, a dynamic range between 10 to 16 f-stops is considered an intermediate dynamic range, though in other examples this is considered an HDR dynamic range. The human visual system is capable for perceiving much larger dynamic range, however, the human visual system includes an adaptation mechanism to narrow the simultaneous range.

Figure 2:
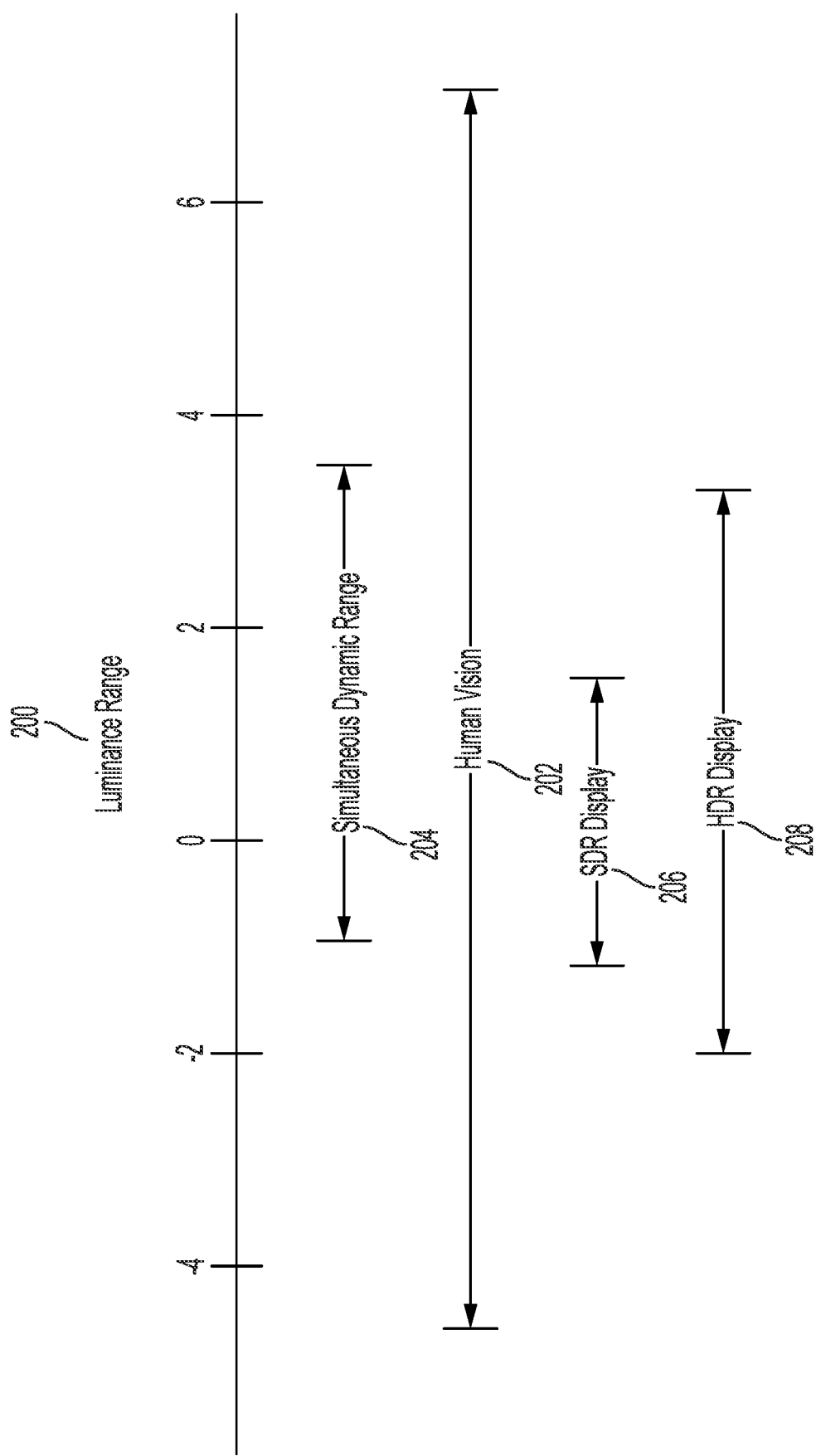
FIG. 2 illustrates the dynamic range of typical human vision, in comparison with the dynamic range of various display types.

FIG. 2 illustrates the dynamic range of typical human vision 202, in comparison with the dynamic range of various display types. FIG. 2 illustrates a luminance range 200, in a nits log scale (e.g., in cd/m² logarithmic scale). By way of example, starlight is at approximately 0.0001 nits, or −4 on the illustrated luminance range 200, and moonlight is at about 0.01 nits (−2 on the luminance range 200). Typical indoor light may be between 1 and 100 nits (0 and 2 on the luminance range 200). Sunlight may be between 10,000 nits and 1,000,000 nits (4 and 6 on the luminance range 200).

Human vision 202 is capable of perceiving anywhere between less than 0.0001 nits to greater than 1,000,000 nits, with the precise range varying from person to person. The dynamic range of human vision 202 includes a simultaneous dynamic range 204. The simultaneous dynamic range 204 is defined as the ratio between the highest and lowest luminance values at which objects can be detected, while the eye is at full adaption. Full adaptation occurs when the eye is at a steady state after having adjusted to a current ambient light condition or luminance level. Though the simultaneous dynamic range 204 is illustrated in the example of FIG. 2 as between about 0.1 nits and about 3200 nits, the simultaneous dynamic range 204 can be centered at other points along the luminance range 200 and the width can vary at different luminance levels. Additionally, the simultaneous dynamic range 204 can vary from one person to another.

FIG. 2 further illustrates an approximate dynamic range for SDR displays 206 and HDR display 208. SDR displays include monitors, televisions, tablet screens, smart phone screens, and other display devices that are capable of displaying SDR content. HDR displays include, for example, ultra-high-definition televisions and other display devices that are capable of displaying HDR content.

BT.709 provides that the dynamic range of SDR displays 206 can be about 0.1 to 100 nits, or about 10 f-stops, which is significantly less than the dynamic range of human vision 202. The dynamic range of SDR displays 206 is also less than the illustrated simultaneous dynamic range 204. Some video application and services are regulated by Rec.709 and provide SDR, and typically support a range of brightness (or luminance) of around 0.1 to 100 nits. SDR displays are also unable to accurately reproduce night time conditions (e.g., starlight, at about 0.0001 nits) or bright outdoor conditions (e.g., around 1,000,000 nits). Some SDR displays, however, may support a peak brightness larger than 100 nits, and may display SDR content with in a range outside 0.1 to 100 nits.

Next generation video services are expected to provide dynamic range of up-to 16 f-stops. HDR displays can cover a wider dynamic range than can SDR displays. For example, HDR displays may have a dynamic range of about 0.01 nits to about 5600 nits (or 16 f-stops). While HDR displays also do not encompass the dynamic range of human vision, HDR displays may come closer to being able to cover the simultaneous dynamic range 204 of the average person. Specifications for dynamic range parameters for HDR displays can be found, for example, in BT.2020 and ST 2084.

Figure 3:
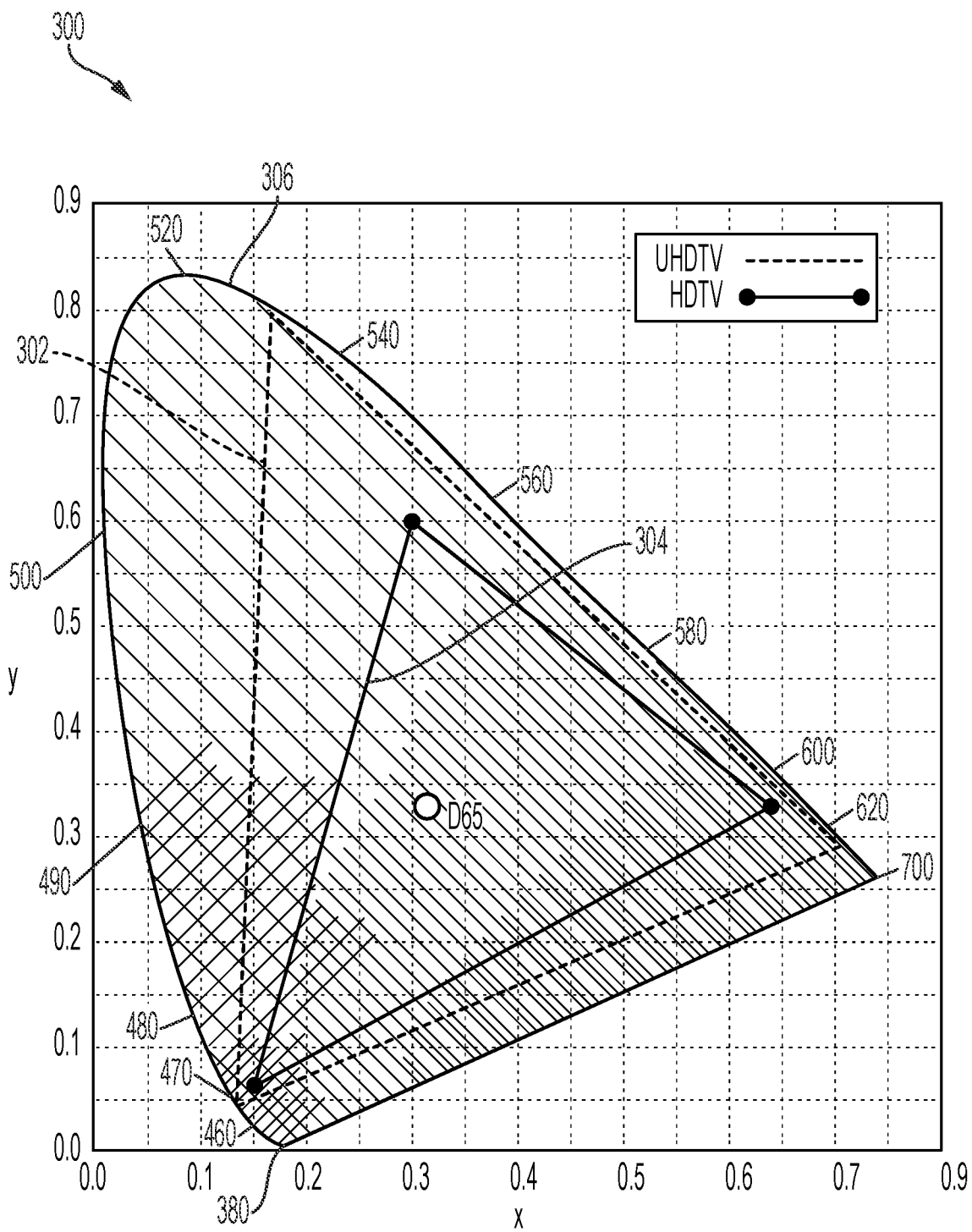
FIG. 3 illustrates an example of a chromaticity diagram.

Color gamut describes the range of colors that are available on a particular device, such as a display or a printer. Color gamut can also be referred to as color dimension. FIG. 3 illustrates an example of a chromaticity diagram 300, overlaid with a triangle representing an SDR color gamut 304 and a triangle representing an HDR color gamut 302. Values on the curve 306 in the diagram 300 are the spectrum of colors; that is, the colors evoked by a wavelength of light in the visible spectrum. The colors below the curve 306 are non-spectral: the straight line between the lower points of the curve 306 is referred to as the line of purples, and the colors within the interior of the diagram 300 are unsaturated colors that are various mixtures of a spectral color or a purple color with white. A point labeled D65 indicates the location of white for the illustrated spectral curve 306. The curve 306 can also be referred to as the spectrum locus or spectral locus, representing limits of the natural colors.

The triangle representing an SDR color gamut 304 is based on the red, green, and blue color primaries as provided by BT.709. The SDR color gamut 304 is the color space used by HDTVs, SDR broadcasts, and other digital media content.

The triangle representing the wide HDR color gamut 302 is based on the red, green, and blue color primaries as provided by BT.2020. As illustrated by FIG. 3, the HDR color gamut 302 provides about 70% more colors than the SDR color gamut 304. Color gamuts defined by other standards, such as Digital Cinema Initiatives (DCI) P3 (referred to as DCI-P3) provide some colors outside the HDR color gamut 302, but do not fully contain the HDR color gamut 302. DCI-P3 is used for digital move projection.

Table 1 illustrates examples of colorimetry parameters for selected color spaces, including those provided by BT.709, BT.2020, and DCI-P3. For each color space, Table 1 provides an x and a y coordinate for a chromaticity diagram.

TABLE 1

Colorimetry parameters for selected color spaces

| Color Space | White Point | | Primary Colors | | | | | |
|---|---|---|---|---|---|---|---|---|
| | $x_w$ | $y_w$ | $x_r$ | $y_r$ | $x_g$ | $y_g$ | $x_b$ | $y_b$ |
| DCI-P3 | 0.314 | 0.351 | 0.68 | 0.32 | 0.265 | 0.69 | 0.15 | 0.06 |
| BT.709 | 0.3127 | 0.329 | 0.64 | 0.33 | 0.3 | 0.6 | 0.15 | 0.06 |
| BT.2020 | 0.3127 | 0.329 | 0.708 | 0.292 | 0.170 | 0.797 | 0.131 | 0.046 |

Video data with a large color volume (e.g., video data with a high dynamic range and wide color gamut) can be acquired and stored with a high degree of precision per component. For example, floating point values can be used to represent the luma and chroma values of each pixel. As a further example, 4:4:4 chroma format, where the luma, chroma-blue, and chroma-red components each have the same sample rate, may be used. The 4:4:4 notation can also be used to refer to the Red-Green-Blue (RGB) color format. As a further example, a very wide color space, such as that defined by International Commission on Illumination (CIE) 1931 XYZ, may be used. Video data represented with a high degree of precision may be nearly mathematically lossless.

A high-precision representation, however, may include redundancies and may not be optimal for compression. Thus, a lower-precision format that aims to display the color volume that can be seen by the human eye is often used.

Figure 4:
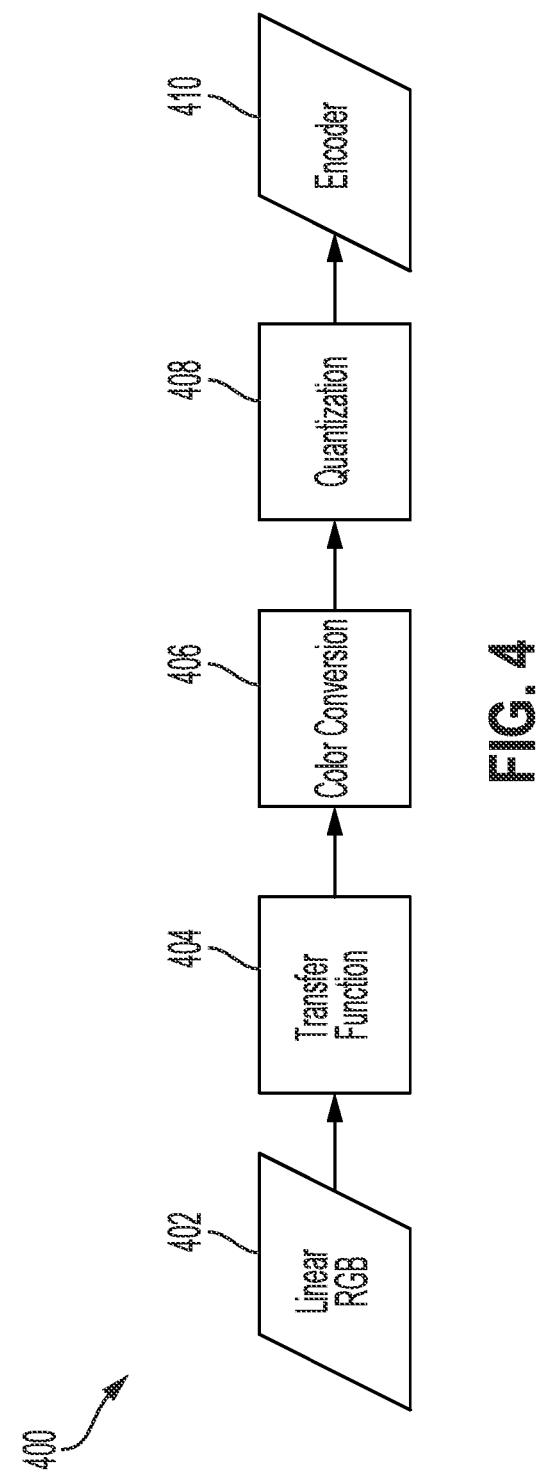
FIG. 4 includes a diagram illustrating an example of a process for converting high-precision linear RGB video data for purposes of encoding the video data.

FIG. 4 includes a diagram illustrating an example of a process 400 for converting high-precision linear RGB 402 video data for purposes of encoding the video data. The converted HDR data may have a lower precision and may be more easily compressed. The example process 400 includes a non-linear transfer function 404, which can compact the dynamic range, a color conversion 406 that can produce a more compact or robust color space, and a quantization 408 function that can convert floating point representations to integer representations. The output of the quantization 408 function can be input into an encoder 410, which can compress or encode the data to produce an encoded bitstream. The encoder 410 can use, for example, the AVC HEVC, or VP8/VP9/VP10 standards. The bitstream can be stored and/or transmitted.

In various examples, linear RGB 402 data, which can have a high dynamic range and a floating point representation, can be compacted using the non-linear transfer function 404. An example of a non-linear transfer function 404 is the perceptual quantizer defined in ST 2084. The output of the transfer function 404 can be converted to a target color space by the color conversion 406. The target color space can be one that is more suitable for compression, such as YCbCr. Quantization 408 can then be used to convert the data to an integer representation. The output of the quantization 408 can be provided to an encoder 410, which can produce an encoded bitstream from the data.

Figure 5:
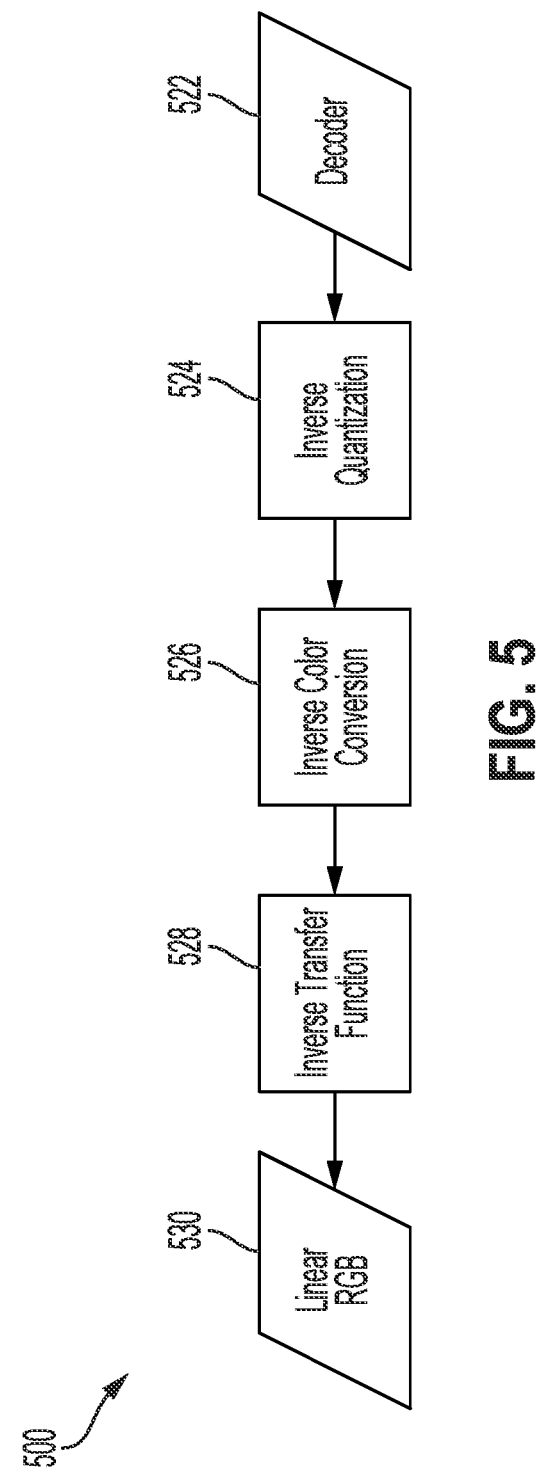
FIG. 5 includes a diagram illustrating an example of a process for restoring converted HDR video data, obtained from a decoded bitstream produced by a decoder.

FIG. 5 includes a diagram illustrating an example of a process 500 for restoring converted HDR video data, obtained from a decoded bitstream produced by a decoder 522. The uncompressed or decoded video signal can be transmitted to an end consumer device using, for example, a high-speed digital interface. Examples of consumer electronic devices and transmission mediums include digital televisions, digital cable, satellite or terrestrial set-top boxes, mobile devices, and related peripheral devices, such as Digital Versatile Disc (DVD) players and/or recorders, and other related decoding devices and consumer devices. In some examples, the decoder 522 can perform steps of the process 500. In some examples, an end consumer electronic device can perform steps of the process 500.

The process 500 can operate on HDR video data that was converted according to the process 400 of FIG. 4, and can approximately produce the high-precision linear RGB 402 video data that was input into the process 400. As illustrated in FIG. 5, the process 500 includes inverse quantization 524 (e.g., for converting integer representations to floating point representations), an inverse color conversion 526, and an inverse transfer function 528.

The inverse quantization 524 of FIG. 5 includes performing the inverse of the computations performed for the quantization 408 of FIG. 4. Similarly, the inverse color conversion 526 includes performing the inverse of the computations performed for the color conversion 406, and the inverse transfer function 528 includes performing the inverse of the computations performed for the transfer function 402. For the sake of clarity, the discussion that follows provides examples of the transfer function 404, the color conversion 406, and the quantization 408, with the understanding that, unless provided otherwise, these examples also apply to the inverse transfer function 528, inverse color conversion 426, and inverse quantization 524. Additionally, the order of the steps of the example processes 400 and 500 are illustrative of the order in which the steps can be performed. In other examples, the steps can occur in a different order. For example, the color conversion 406 can precede the transfer function 404. In another example, the inverse color conversion 526 can be performed after the inverse transfer function 5284. In other examples, additional processing can also occur. For example, spatial subsampling may be applied to color components.

The transfer function can be used to map the digital values in an image to and from optical energy. Optical energy, which is also referred to as optical power, is the degree to which a lens, mirror, or other optical system converges or diverges light. The transfer function can be applied to the data in an image to compact the dynamic range. Compacting the dynamic range may enable video content to represent the data with a limited number of bits. The transfer function can be a one-dimensional, non-linear function that can either reflect the inverse of the electro-optical transfer function (EOTF) of an end consumer display (e.g., as specified for SDR in BT.709), or approximate the human visual system's perception of brightness changes (e.g., as a provided for HDR by the perceptual quantizer (PQ) transfer function specified in ST 2084). An electro-optical transfer function describes how to turn digital values, referred to as code levels or code values, into visible light. For example, an EOTF can map the code levels back to luminance values. The inverse process of the electro-optical transform is the optical-electro transform (OETF), which can produce code levels from luminance.

Figure 6:
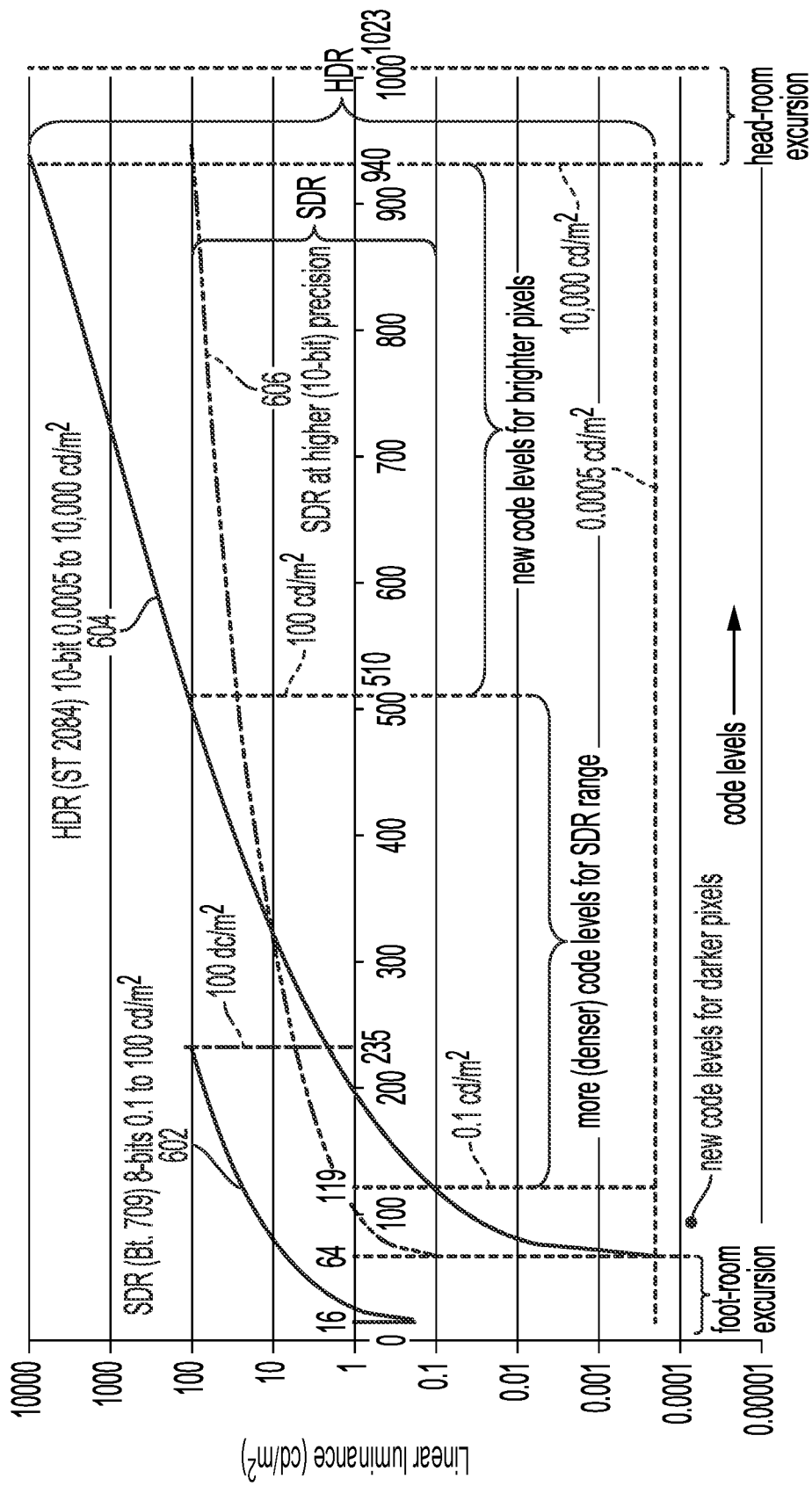
FIG. 6 includes a chart that illustrates examples of luminance curves produced by transfer functions.

FIG. 6 includes a chart that illustrates examples of luminance curves produced by transfer functions. Each curve charts a luminance value at different code levels. Curves for the transfer functions defined by BT.709 (curve 602) and ST 2084 (curve 604) are illustrated, as well as a representative curve 606 for 10-bit SDR data. FIG. 6 also illustrates dynamic ranges enabled by each transfer function. In other examples, curves can separately be drawn for red (R), green (G), and blue (B) color components.

ST 2084 provides a transfer function that can more efficiently support a higher dynamic range data. The transfer function of ST 2084 is applied to normalized, linear R, G, and B values, which produces non-linear representations, referred to herein as R', G', and B'. ST 2084 further defines normalization by NORM=10000, which is associated with a peak brightness of 10,000 nits. The R', G', and B' values can be calculated as follows:

$$R'=PQ\_TF(\max(0,\min(R/NORM,1)))$$

$$G'=PQ\_TF(\max(0,\min(G/NORM,1)))$$

$$B'=PQ\_TF(\max(0,\min(B/NORM,1))) \qquad (1)$$

In Equation (1), the transfer function, PQ_TF, is defined as follows:

$$PQ\_TF(L) = \left(\frac{c_1 + c_2 L^{m_1}}{1 + c_3 L^{m_1}}\right)^{m_2}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

-continued $$c_3 = \frac{2392}{4096} \times 32 = 18.6875$$

Figure 7:
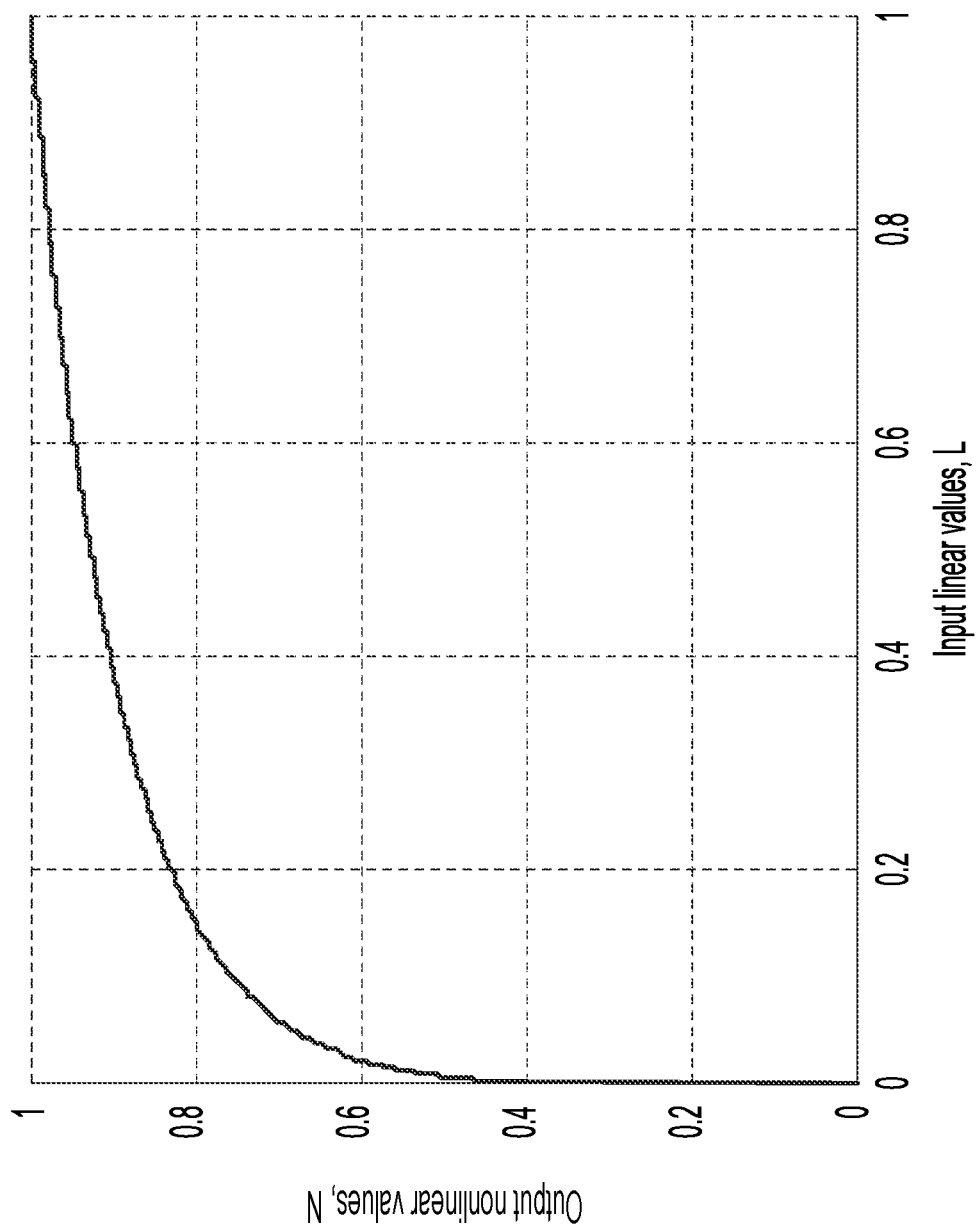
FIG. 7 includes a graph illustrating an example of input values to PQ_TF.

FIG. 7 includes a graph illustrating an example of the input values to PQ_TF (e.g., linear color values) normalized to a range of 0 . . . 1 and corresponding output values (e.g., non-linear color values). As illustrated in this graph, 1% of the dynamic range of the input signal (e.g., representing low illumination) is converted to 50% of the dynamic range of the output signal.

The electro-optical transfer function can be defined as a function with a floating point accuracy. By having floating point accuracy, it is possible to avoid introducing errors into a signal that incorporates the non-linearity of the function when an inverse function (e.g., an optical-electro transfer function) is applied. This inverse transfer function specified by ST 2048 is as follows:

$$R = 10000 * \text{inversePQ\_TF}(R')$$

$$G = 10000 * \text{inversePQ\_TF}(G')$$

$$B = 10000 * \text{inversePQ\_TF}(B') \quad (2)$$

In Equation (2), the inverse transfer function, inversePQ_TF, is defined as follows:

$$\text{inversePQ\_TF}(N) = \left( \frac{\max[(N^{1/m_2} - c_1), 0]}{c_2 - c_3 N^{1/m_2}} \right)^{1/m_1}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

With floating point accuracy, sequential application of an EOTF and OETF can provide near exact reconstruction without errors. Representation of the linear color data using an EOTF, however, may not be optimal for streamlining or broadcasting services. Additional processing, as described below, can produce a more compact representation of the non-linear R'G'B' data, which has fixed-bit accuracy.

Other transfer functions and inverse transfer functions have been defined. A video coding system can use one of these other transfer functions and inverse transfer functions instead of or in addition those provided by ST 2084.

Color conversion can reduce the size of the color space of the linear RGB input. Image capture systems often capture images as RGB data. The RGB color space, however, can have a high degree of redundancy among color components. RGB is thus not optimal for producing a compact representation of the data. To achieve a more compact and more robust representation, RGB components can be converted to a more uncorrelated color space, such as YCbCr, which may be more suitable for compression. The YCbCr color space separates the brightness in the form of luminance and color information in different un-correlated components, including luma (Y), chroma-blue (Cb), and chroma-red (Cr).

The YCbCr color space is one target color space used by BT.709. BT.709 provides the follow conversion for the non-linear R', G', and B' values to a non-constant luminance representation, Y', Cb, and Cr:

$$Y' = 0.2126 * R' + 0.7152 * G' + 0.0722 * B' \quad (3)$$

$$Cb = \frac{B' - Y'}{1.8556}$$

$$Cr = \frac{R' - Y'}{1.5748}$$

The conversion provided by Equation (3) can also be implemented using the following approximate conversions, which avoids the division for the Cb and Cr components:

$$Y' = 0.212600 * R' + 0.715200 * G' + 0.072200 * B'$$

$$Cb = -0.114572 * R' - 0.385428 * G' + 0.500000 * B'$$

$$Cr = 0.500000 * R' - 0.454153 * G' - 0.045847 * B' \quad (4)$$

The BT.2020 specifies the following conversion process from R', G', and B' to Y, Cb, and Cr:

$$Y' = 0.2627 * R' + 0.6780 * G' + 0.0593 * B' \quad (5)$$

$$Cb = \frac{B' - Y'}{1.8814}$$

$$Cr = \frac{R' - Y'}{1.4746}$$

The conversion provided by Equation (5) can also be implemented using the following approximate conversion, which avoids the division for the Cb and Cr components:

$$Y' = 0.262700 * R' + 0.678000 * G' + 0.059300 * B'$$

$$Cb = -0.139630 * R' - 0.360370 * G' + 0.500000 * B'$$

$$Cr = 0.500000 * R' - 0.459786 * G' - 0.040214 * B' \quad (6)$$

In these and other examples, the input color space (e.g., the R'G'B' color space) an the output color space (e.g., the Y'CbCr color space) remain normalized. Thus, for input values normalized in the range of 0 . . . 1 the output values will also be mapped to the range of 0 . . . 1. In some examples, values of Cb and Cr are normalized in the range of −0.5 to 0.5, where Cb and Cr values both equal to 0 indicate grey colors. Color transforms implemented with floating point accuracy can approach perfect reconstruction, resulting in a lossless process.

After color conversion, the input data, now in the target color space, may still be represented with a high-bit depth (e.g., with floating point accuracy) and may be lossless. This degree of accuracy, however, may be redundant and excessive for most consumer electronics applications. In some examples, 10-bit to 12-bit accuracy, in combination with the PQ transfer function, may be sufficient for the HDR data to have 16 f-stops with a distortion that is just below what is noticeable by human vision. HDR data with 10-bit accuracy can further be coded by most video coding systems.

Quantization can convert the data to a target bit depth. Quantization is a lossy process, meaning that some information is lost, and may be a source of inaccuracy in the output HDR data.

The following equations provide an example of quantization that can be applied to code words in the target color space. In this example, input values for Y, Cb, and Cr that have floating point accuracy can be converted into fixed bit depth values BitDepthY for the Y value and BitDepthC for the chroma values (Cb and Cr).

$$D_Y = Clip1_Y(Round((1<<(BitDepth_Y-8))*(219*Y'+16)))$$

$$D_{Cb} = Clip1_C(Round((1<<(BitDepth_C-8))*(224*Cb+128)))$$

$$D_{Cr} = Clip1_C(Round((1<<(BitDepth_C-8))*(224*Cr+128))) \quad (7)$$

In the above:
Round(x)=Sign(x)*Floor(Abs(x)+0.5)
Sign(x)=−1 if x<0, 0 if x=0, 1 if x>0
Floor(x) the largest integer less than or equal to x
Abs(x)=x if x>=0, −x if x<0
Clip1Y(x)=Clip3(0, (1<<BitDepthY)−1, x)
Clip1C(x)=Clip3(0, (1<<BitDepthC)−1, x)
Clip3(x,y,z)=x if z<x, y if z>y, z otherwise In some cases, converting video data with a large color volume to video data with a more compact color volume can result in dynamic range changes. These dynamic range changes may be visible in the reconstructed video as distortions, such as color mismatches or color bleeding, among other examples. Dynamic Range Adjustment (DRA) is a technique for compensating for the dynamic range changes, and lessening possible distortions. DRA was proposed in "Dynamic Range Adjustment SEI to enable High Dynamic Range video coding with Backward-Compatible Capability," D. Rusanovskyy, A. K. Ramasubramonian, D. Bugdayci, S. Lee, J. Sole, and M. Karczewicz, VCEG document COM16-C 1027-E, Sep. 2015, which is hereby incorporated by reference in its entirety and for all purposes.

In various examples, DRA can be implemented using a piece-wise linear function f(x) that is defined for a group of non-overlapping dynamic range partitions, which are also referred to herein as ranges, where each range partition or range includes a set of input values x (e.g., input color values). The ranges are represented herein by {Ri}, where i is an index of each respective range and i=0 . . . N−1, inclusive, with N being the total number of ranges used for defining the DRA function. As an example, it can be assumed that the ranges are defined by a minimum and a maximum x value that belong to the each respective range Ri; for example for the input values [$x_i$, $x_{i+1}$−1], $x_i$ and $x_{i+1}$ can denote minimum value of the ranges Ri and R(i+1) respectively. Applied to the Y color component of the video (e.g., the luma value), the DRA function $S_y$ can be defined using a scale value $S_{y,i}$ and an offset value $O_{y,i}$, which can be applied to every input value (that is, for every x∈[$x_i$, $x_{i+1}$−1]). The DRA function can thus be defined as the set of scale and offset values for each input value, or $S_y = \{S_{y,i}, O_{y,i}\}$. Using this definition for the DRA function, for any range Ri and for every x∈[$x_i$, $x_{i+1}$−1], an output value X can be calculated as follows:

$$X = S_{y,i} \times (x - O_{y,i}) \quad (8)$$

An inverse DRA mapping for the luma component Y can be conducted at a decoder. In this case, the DRA function $S_y$ can be defined by the inverse of the scale value $S_{y,i}$ and the offset value $O_{y,i}$. The inverse scale value and offset value can be applied to every X∈[$X_i$, $X_{i+1}$−1].

Using this definition of the inverse DRA function, for any range Ri and for every output value X∈[$X_i$, $X_{i+1}$−1], a reconstructed x value can be calculated as follows:

$$x = X/S_{y,i} + O_{y,i} \quad (9)$$

A DRA mapping process (e.g., for encoding purposes) can also be defined for the chroma components, Cb and Cr. In the following example, u denotes a sample of a Cb color component that belongs to the range Ri. In this example, u∈[$u_i$, $u_{i+1}$−1] The DRA function $S_u$ for a chroma sample can also be defined using a scale value $S_{u,i}$ and an offset value $O_{u,i}$, such that $S_u = \{S_{u,i}, O_{u,i}\}$. An output value U can thus be calculated as follows:

$$U = S_{u,i} \times (u - O_{u,i}) + \text{Offset} \quad (10)$$

In Equation (10), Offset is equal to $2^{(bitdepth-1)}$ and denotes a bi-polar Cb, Cr signal offset.

An inverse DRA mapping for the chroma components Cb and Cr can also be defined and can be performed at a decoder. In the following example, U denotes a sample of a remapped Cb color component from the range Ri, where U∈[$U_i$, $U_{i+1}$−1]. In this example, the Cb component can be reconstructed using the following equation:

$$u = (U - \text{Offset})/S_{u,i} + O_{y,i} \quad (11)$$

In Equation (11), Offset is equal to $2^{(bitdepth-1)}$ and denotes a bi-polar Cb, Cr signal offset.

An additional technique for reducing distortion that can occur when modifying the color space of a video is Luma-driven Chroma Scaling (LCS). Luma-Driven Chroma Scaling was proposed in JCTVC-W0101 HDR CE2: Report on CE2.a-1 LCS, A. K. Ramasubramonian, J. Sole, D. Rusanovskyy, D. Bugdayci, and M. Karczewicz, which is hereby incorporated by reference in its entirety and for all purposes.

LCS is a technique by which chroma information (e.g., Cb and Cr samples) is adjusted by taking advantage of brightness information associated with a processed chroma sample. Similar to the DRA approach described above, LCS includes applying a scaling factor $S_u$ for the Cb component and a scaling factor $S_{v,i}$ for the Cr component. With LCS, however, instead of defining the DRA function as a piece-wise linear function (e.g., as $S_u = \{S_{u,i}, O_{u,i}\}$ for a set of ranges {$R_i$} accessible by chroma values u or v as in Equations (3) or (4)), the LCS approach uses the luma value Y to derive a scale factor for the chroma sample. For example, mapping of the chroma sample u (or v) for purposes of encoding the video data can be performed using the following equation:

$$U = S_{u,i}(Y) \times (u - \text{Offset}) + \text{Offset} \quad (12)$$

The inverse LCS process, for decoding purposes, can be defined as follows:

$$u = (U - \text{Offset})/S_{u,i}(Y) + \text{Offset} \quad (13)$$

As a further example, for a given pixel located at (x, y), chroma samples Cb(x, y) and/or Cr(x, y) are scaled with a factor derived from a corresponding LCS function $S_{Cb}$ (or $S_{Cr}$) accessed using luma value Y'(x, y).

In the forward mapping process (e.g., when processing for encoding) for chroma samples, Cb (or Cr) values and an associated luma value Y' are taken as an input to the chroma scale function $S_{Cb}$ (or $S_{Cr}$) and Cb or Cr are converted into Cb' and Cr' as shown below in Equation (14).

$$Cb'(x,y) = S_{Cb}(Y'(x,y)) \times Cb(x,y),$$

$$Cr'(x,y) = S_{Cr}(Y'(x,y)) \times Cr(x,y) \quad (14)$$

On decoding, the inverse LCS process is applied, and reconstructed Cb' or Cr' are converted to Cb or Cr as shown below in Equation (15).

$$Cb(x, y) = \frac{Cb'(x, y)}{S_{Cb}(Y'(x, y))} \quad (15)$$

$$Cr(x, y) = \frac{Cr'(x, y)}{S_{Cr}(Y'(x, y))}$$

Figure 8:
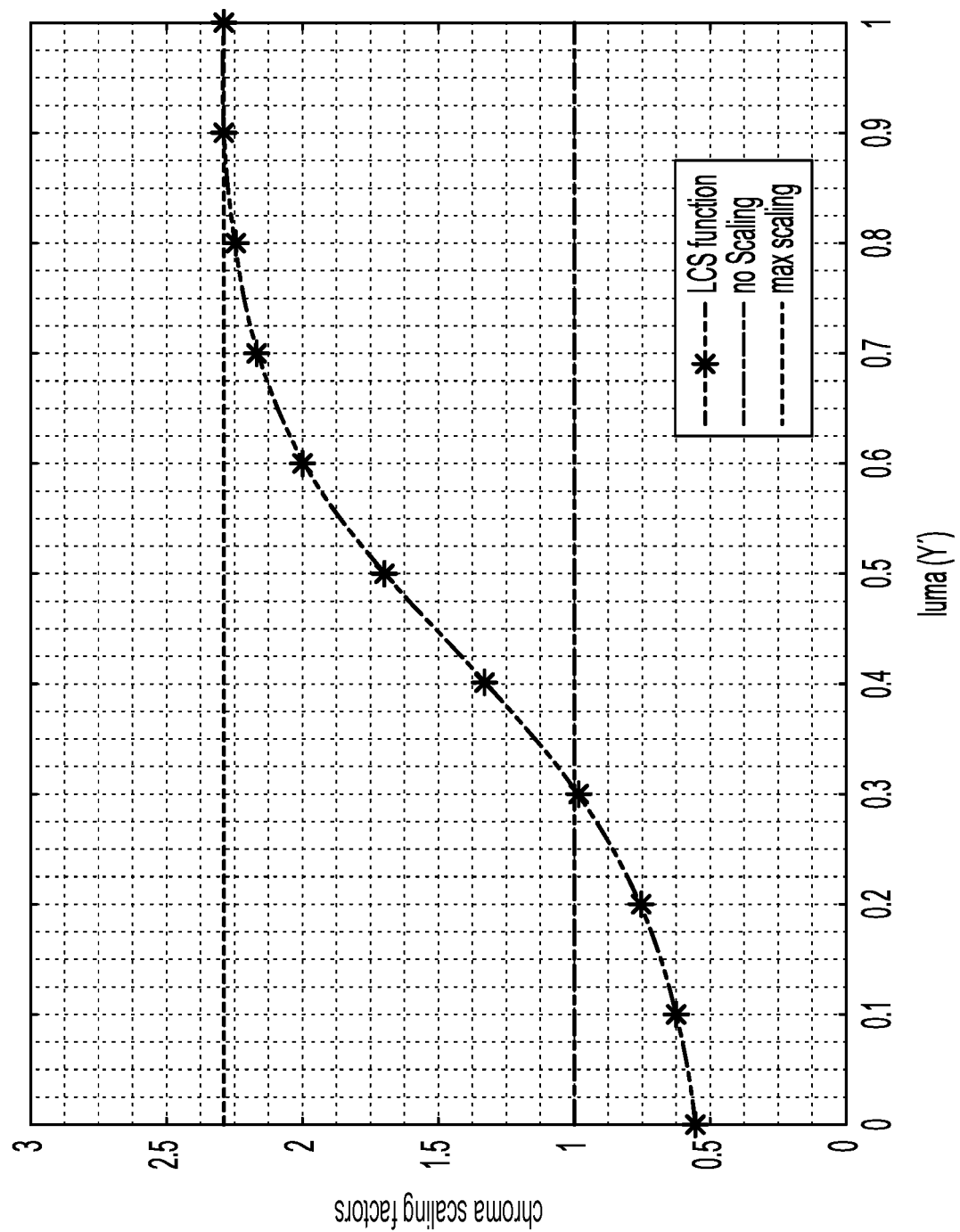
FIG. 8 includes a graph illustrating an example of an LCS function.

FIG. 8 includes a graph illustrating an example of an LCS function. In this example, chroma components of pixels that have a smaller luma value are multiplied with smaller scaling factors.

To adjust compression ratio at encoders, embodiments that include block transform-based video coding schemes may utilize a scalar quantizer (such as described with respect to quantization unit 54 of FIG. 13 and inverse quantization unit 86 of FIG. 14) which is applied to block transform coefficients:

$$Xq = X/scalerQP$$

where Xq is a quantized codevalue of the transform coefficient X produced by applying scaler scalerQP derived from QP parameter; in most codecs, the quantized codevalue would be approximated to an integer value (e.g. by rounding). In some embodiments, the quantization may be a different function which depends not just on the QP but also on other parameters of the CODEC.

In some embodiments, a scaler value scalerQP is controlled with Quantization Parameter (QP) with the relationship between QP and scalar quantizer defined as following, where k is a known constant:

$$scalerQP = k * 2^{(QP/6)} \quad (16)$$

The inverse function defines relationship between scalar quantizer applied to transform coefficient and QP of HEVC (for example) as follows:

$$QP = \ln(scalerQP/k) * 6/\ln(2); \quad (17)$$

Respectively, an additive change in the QP value, e.g. deltaQP, would result in multiplicative change in the scalerQP value applied to the transform coefficients.

DRA is effectively applying a value such as a scaleDRA value to the pixel sample values, and taking into consideration transform properties, can be combined with scalerQP values as following:

$$Xq = T(scaleDRA*x)/scaleQP$$

where Xq are quantized transform coefficients produced by transform T of the scaled x sample values and scaled with scaleQP applied in transform domain. Thus, applying multiplicator scaleDRA in pixel domain results in effective change of scaler quantizer scaleQP, which is applied in the transform domain. This in turn can be interpreted in the additive change of QP parameter applied to the current processed block of data:

$$dQP = \log 2(scaleDRA)*6 \quad (18)$$

where dQP is approximate QP offset introduced by HEVC by deploying DRA on the input data.

Some of state-of-the-art video coding designs, such as HEVC and newer designs under development such as VVC, may utilize a pre-defined dependency between luma and chroma QP values effectively applied to process currently coded block Cb. Such dependency may be utilized to achieve an optimal bitrate allocation between luma and chroma components. Example of such dependency is represented by Table 8-10 of HEVC specification, where QP value applied for decoding of the chroma samples are derived from QP values utilized for decoding luma samples. The relevant section where the chroma QP value is derived based on the QP value of the corresponding luma sample (QP value applied to the block/TU, corresponding luma sample belongs to), chroma QP offsets and Table 8-10 of HEVC specification is reproduced below:

When ChromaArrayType is not equal to 0, the following applies:

The variables $qP_{Cb}$ and $qP_{Cr}$ are derived as follows:
If tu_residual_act_flag[xTbY][yTbY] is equal to 0, the following applies:

$qPi_{Cb}$=Clip3(−QpBdOffset$_C$,57,$Qp_Y$+pps_cb_qp_offset+slice_cb_qp_offset+CuQpOffset$_{Cb}$) (8-287)

$qPi_{Cr}$=Clip3(−QpBdOffset$_C$,57,$Qp_Y$+pps_cr_qp_offset+slice_cr_qp_offset+CuQpOffset$_{Cr}$) (8-288)

Otherwise (tu_residual_act_flag[xTbY][yTbY] is equal to 1), the following applies:

$qPi_{Cb}$=Clip3(−QpBdOffsetC,57,$Qp_Y$+PpsActQpOffsetCb+slice_act_cb_qp_offset+CuQpOffsetCb) (8-289)

$qPi_{Cr}$=Clip3(−QpBdOffsetC,57,$Qp_Y$+PpsActQpOffsetCr+slice_act_cr_qp_offset+CuQpOffsetCr) (8-290)

If ChromaArrayType is equal to 1, the variables $qP_{Cb}$ and $qP_{Cr}$ are set equal to the value of Qpc as specified in Table 8-10 based on the index qPi equal to $qPi_{Cb}$ and $qPi_{Cr}$, respectively.

Otherwise, the variables $qP_{Cb}$ and $qP_{Cr}$ are set equal to Min(qPi, 51), based on the index qPi equal to $qPi_{Cb}$ and $qPi_{Cr}$, respectively.

The chroma quantization parameters for the Cb and Cr components, $Qp'_{Cb}$ and $Qp'_{Cr}$, are derived as follows:

$Qp'_{Cb}$=$qP_{Cb}$+QpBdOffset$_C$ (8-291)

$Qp'_{Cr}$=$qP_{Cr}$+QpBdOffset$_C$ (8-292)

TABLE 8-10

HEVC - Specification of Qp$_C$ as a function of qPi for ChromaArrayType equal to 1

| | qPi | | | | | | | | | | | | | | | |
|---|---|---|---|---|---|---|---|---|---|---|---|---|---|---|---|---|
| | <30 | 30 | 31 | 32 | 33 | 34 | 35 | 36 | 37 | 38 | 39 | 40 | 41 | 42 | 43 | >43 |
| Qp$_C$ | =qPi | 29 | 30 | 31 | 32 | 33 | 33 | 34 | 34 | 35 | 35 | 36 | 36 | 37 | 37 | =qPi − 6 |

In video coding systems employing both uniform scalar quantization in transform domain and pixel domain scaling with DRA, derivation of the scale DRA value applied to chroma samples (Sx) can be dependent on the following:

$S_Y$: Luma scale value of the associated luma sample $S_{CX}$: Scale derived from the gamut of the content, where CX stands for Cb or Cr as applicable $S_{corr}$: correction scale term based for accounting for mismatch in transform coding and DRA scaling, e.g. to compensate dependency introduced by Table 8-10 of the HEVC $S_X$=fun($S_Y$, $S_{CX}$, $S_{corr}$).

One example includes a separable function defined as follows: $S_X$=f1($S_Y$)*f2($S_{CX}$)*f3($S_{corr}$).

Embodiments include HDR video coding systems employing both uniform scalar quantization in transform domain and pixel domain scaling with DRA the derivation of chroma DRA scales $S_X$ depends on the following terms: luma DRA scale value $S_Y$, chroma scale ($S_{CX}$) associated with color container and native color gamut of the content which is being coded, and QP settings of the hybrid video codec (also called the base QP) used to compress the content and parameters of dependency between luma and chromaQP settings employed by the codec. The container scale factor ($S_{CX}$) term can be derived according to Eq (16) from a QP offset value that corresponds to the base QP, as recommended (chroma QP offset configuration) in ITU-T H.Sup 15: Conversion and coding practices for HDR//WCG Y'CbCr 4:2:0 video with PQ transfer characteristics, Recommendation H.Sup15 (01/17), https://www.itu.int/rec/T-REC-H.Sup15-201701-I/en).

For embodiments of DRA video coding systems based on HEVC, VVC, or similar, there may also be a chroma scale correction term ($S_{corr}$) that accounts for chroma QP correction introduced by chroma QP table utilized by decoder, similar to that defined in Table 8-10 of HEVC.

Figure 9:
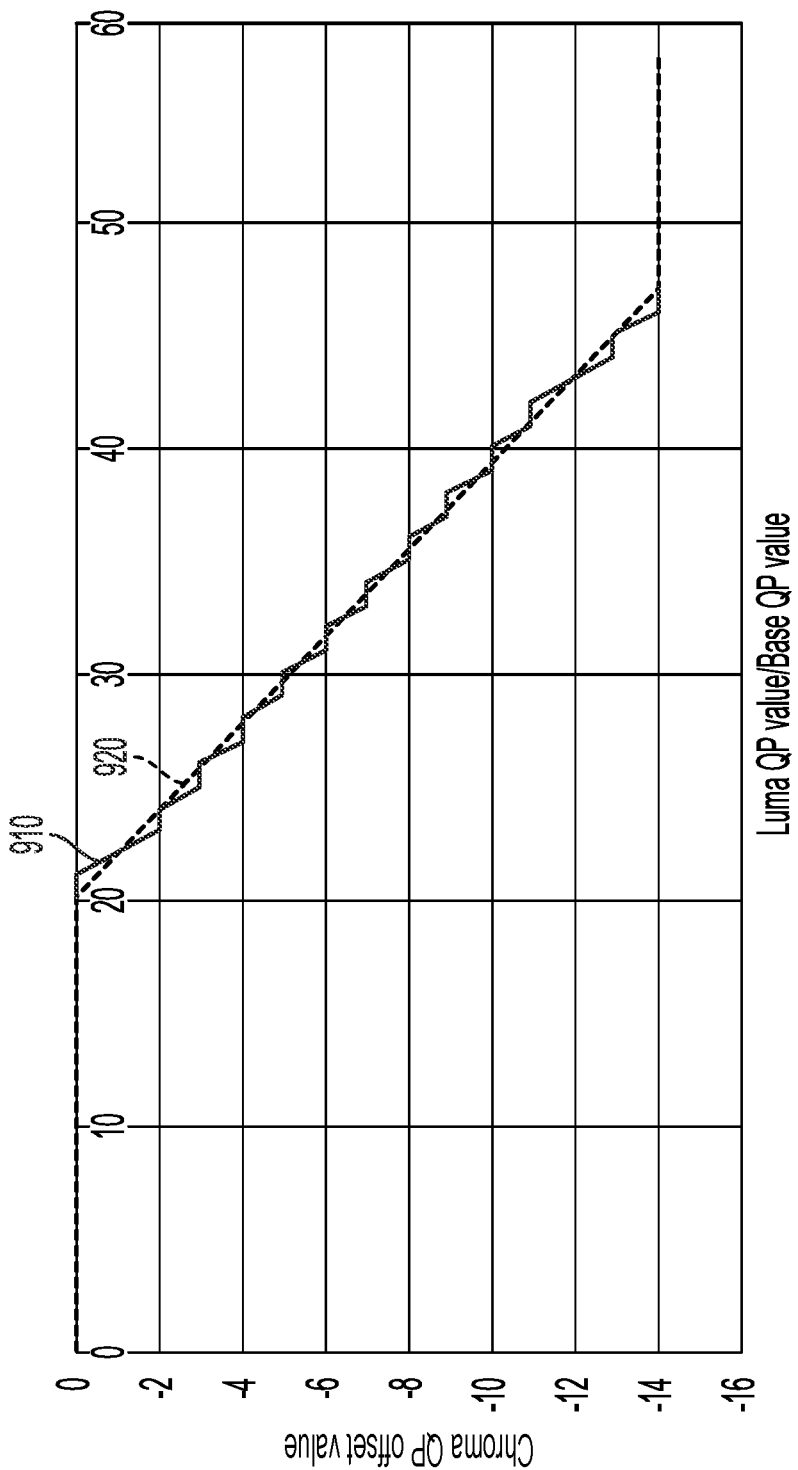
FIG. 9 includes a graph that plots a y-value for a range on x values, illustrating a comparison of an example of chroma QP offset as function of input QP and a linear approximation of this dependency.

FIG. 9 includes a graph that plots a y-value for a range on x values, illustrating a comparison of an example of chroma QP offset as function of input QP, curve 910, and a linear approximation of this dependency, curve 920.

Figure 10:
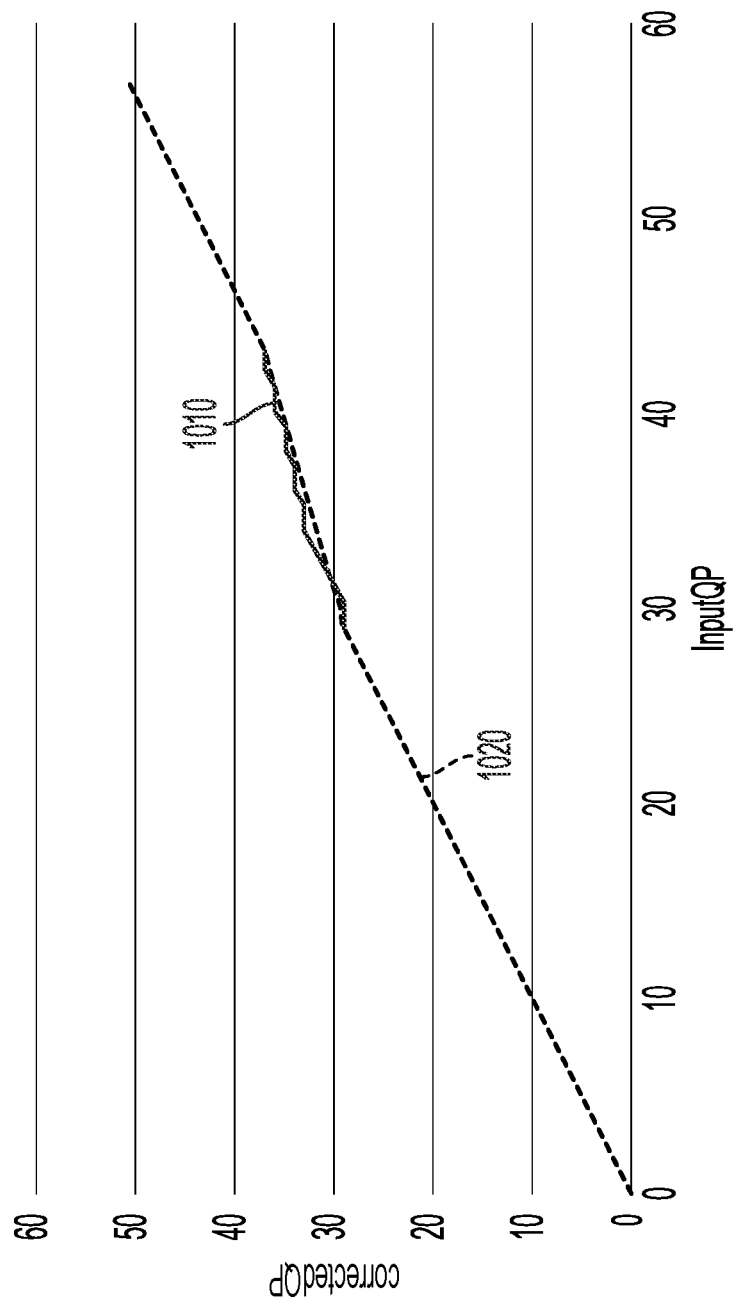
FIG. 10 includes a graph that plots a y-value for a range on x values, illustrating a comparison of a chroma QP correction to its linear approximation.

FIG. 10 includes a graph that plots a y-value for a range on x values, illustrating a comparison of a chroma QP correction using HEVC Table 8-10 (curve 1010, to its linear approximation (curve 1020).

Both latter terms, Scx and Scorr, are derived from integer QP settings of the codec; thus the resulting scale function derived by Eq.16 features discontinuities (stair-like function) originated from integer valued QPs, see dashed 910 and 1010 in FIGS. 9 and 10. These discontinuities may affect the performance of the encoding using DRA resulting in severe visual artifacts and quality degradation. Accordingly, use of DRA functions that avoid such discontinuities may be desirable.

Embodiments include various aspects to improve video coding with dynamic range adaptation, including efficient signaling mechanisms. It is to be understood that one or more of these aspects may be used independently, or in combination with other methods.

One embodiment includes a coding system that comprises defining a first parametric function relation between the chroma DRA scale and a coding parameter such as QP settings utilized by block transform based hybrid video codec used to code the content, or similar parameter specifying the rate/quality of the codec, such that function may be linear or non-linear (not necessarily piecewise linear) without discontinuity. In some embodiments, the parametric function may be defined for each picture of the sequence, explicitly or using a pre-determined method based on the position of the picture in the GOP/intra period/random access period/sequence.

Optionally, embodiments may include signaling (by the video encoder 104 in an encoded video bitstream) the first parametric function in the encoded bitstream to the decoder by signaling the associated parameters in the bitstream. In such embodiments, the decoder uses these decoded parameters to derive the parametric function and use the function to derive the chroma scale values to be applied during DRA. In some embodiments, the parametric function may be implemented as a parameterized one dimensional (1D) function. In some alternative embodiments, the first parametric function may be derived at the decoder using an algorithm thus not resulting in any signaling (i.e. without explicit signally of the first parametric function).

In some embodiments, the coding system may include defining a second parametric function to specify (or used to derive) the chroma DRA scale correction term as a function of one or more parameters associated with the codec and using the second function to derive the chroma scale correction term. In some embodiments, the chroma DRA scale correction term is defined as a function of the QP associated with the luma and the offsets associated with luma and chroma.

Optionally, embodiments may include signaling (by the video encoder 104 in an encoded video bitstream) the second parametric function to the decoder using the parameters; deriving the second parametric function at the decoder; using the derived function to derive the chroma scale correction term at the decoder.

In some alternatives, the second parametric function may be a piecewise linear function. In some alternatives, the second parametric function may be specified as a parameterized 1-D function and the parameters may be signaled to the decoder 112.

In other alternatives, the second parametric function may be pre-determined to be used at the encoder and decoder. In such embodiments, a fixed second function may be used or one of a specified set of functions may be identified by implicit or explicitly signaled parameters.

In some embodiments the definition of the first parametric function may be using fixed point arithmetic. Optionally, the derivation of the first parametric function may also be done using fixed-point arithmetic.

In some embodiments the definition of the second parametric function may be using fixed point arithmetic. Optionally, the derivation of the second parametric function may also be done using fixed-point arithmetic.

Further further details of examples of how one or more systems and methods according to the various aspects described above may be implemented are now described.

In some embodiments, real-valued chroma DRA scale values can be defined directly as a function, without intermediate representation through integer QP values. The scale $S_{CX}$ may be defined as following using the parameters $k_X$, a and b:

$$S_{CX}=f1(k_X*(a*QP+b))$$

where f1( ) describes the relation between the real-valued QP terms (e.g. a QP offset value) and the DRA scale values (e.g. logarithmic derivation of scale from QP parameters, as shown in Eq. 16.)

The parameters a and b stand as scale and offset terms and $k_X$ is a component specific scale term that may vary for Cb and Cr. A clip function may also be used in the definition of the scale function in order to restrict the max and minimum contributions due to the container. For example:

$$S_{CX}=\text{Clip3}(s_{max},s_{min},k_X*(a*QP+b))$$

where $s_{max}$ and $s_{min}$ are the maximum and the minimum scale values to which the function is clipped. It may be understood that the above function is only an example of the scale term being a function of the QP, the scale term may be defined based on additional parameters (e.g. chroma offset, associated luma sample value, chroma sample value, etc.) using additional parameters.

The parameters $k_x$, a, b, $s_{max}$ $s_{min}$ may be signaled in the bitstream using fixed/variable length codes. The number of bits associated with the signaling of one or more of those parameters may also be signaled in the bitstream.

In some alternative implementation, QP to scale derivation mechanism can be integrated in the defined function as follows, and the parameters of the function f2( ) may be signaled. Alternatively, the function f2( ) is known at the encoder 104 and decoder 112 as a side information (fixed in the codec or otherwise pre-defined independently of the coding layer of the bitstream) and no signaling is required.

$$S_{CX}=f2(QP)$$

The scale correction term $S_{corr}$ may be derived based on the base QP as follows. Let sQP be a parameterized function defined on the base QP as sQP (QP):

$$localQP1=sQP(QP)$$

The sQP value may also be defined on other variables such chroma QP offset and luma delta QP values. In other alternatives, additionally the sQP value may also be dependent on the luma DRA scale $S_Y$. The scale correction term may be obtained by a difference of two local QP values as follows:

$$qpDiff=sQP(QP+chromaQPOffset)-sQP(QP+chromaQPOffset+deltapQP)$$

$$Score=k*2^{(qpDiff/6)}$$

where deltaQP represent additive QP change applied to the current pixel or block of pixels. This QP change can be either introduced at block transform domain or by pixel domain scaling with Sy. In the latter case, deltaQP variable can be derived as shown in Eq. 17:

$$deltaQP=(\ln(S_Y/k)*6/\ln \quad (2)$$

Note that depending on the how the chromaQPOffset and $S_Y$ are defined, the above equations may be different to account for negative sign or reciprocal.

In some embodiments, the dependency of chroma QP on the Luma QP may not be defined using tabulated integer-valued QP LUT, similar to Table 8-10 of HEVC; instead a function allowing a real-valued mapping may be used as follows:

$$QP_{corr}=fun(QP_{est})$$

$$QP_{est}=\text{Clip3}(-QpBdOffsetC,57,QpY_{est}+Pps\text{-}ActQpOffsetCb+slice\_act\_cb\_qp\_offset+CuQpOffsetCb) \quad (8\text{-}289)$$

where $OP_{corr}$ is a corrected real-valued variable derived from a real-valued variable $QpY_{est}$, which may be estimated from Luma scale applied to the corresponding Y sample.

In such embodiments, chroma QP value utilized in decoder derivation may be produced by rounding off $QP_{corr}$ value to an integer value, whereas chroma scale correction value $S_{corr}$ can be produced directly from a real number $OP_{corr}$.

In some embodiments, the dependency of chroma QP offset or its corresponding chroma scale representation reflecting color container/gamut representation can be defined at the decoder side either as a function dependent on QP or as a tabulated LUT from integer QP values.

Figure 11:
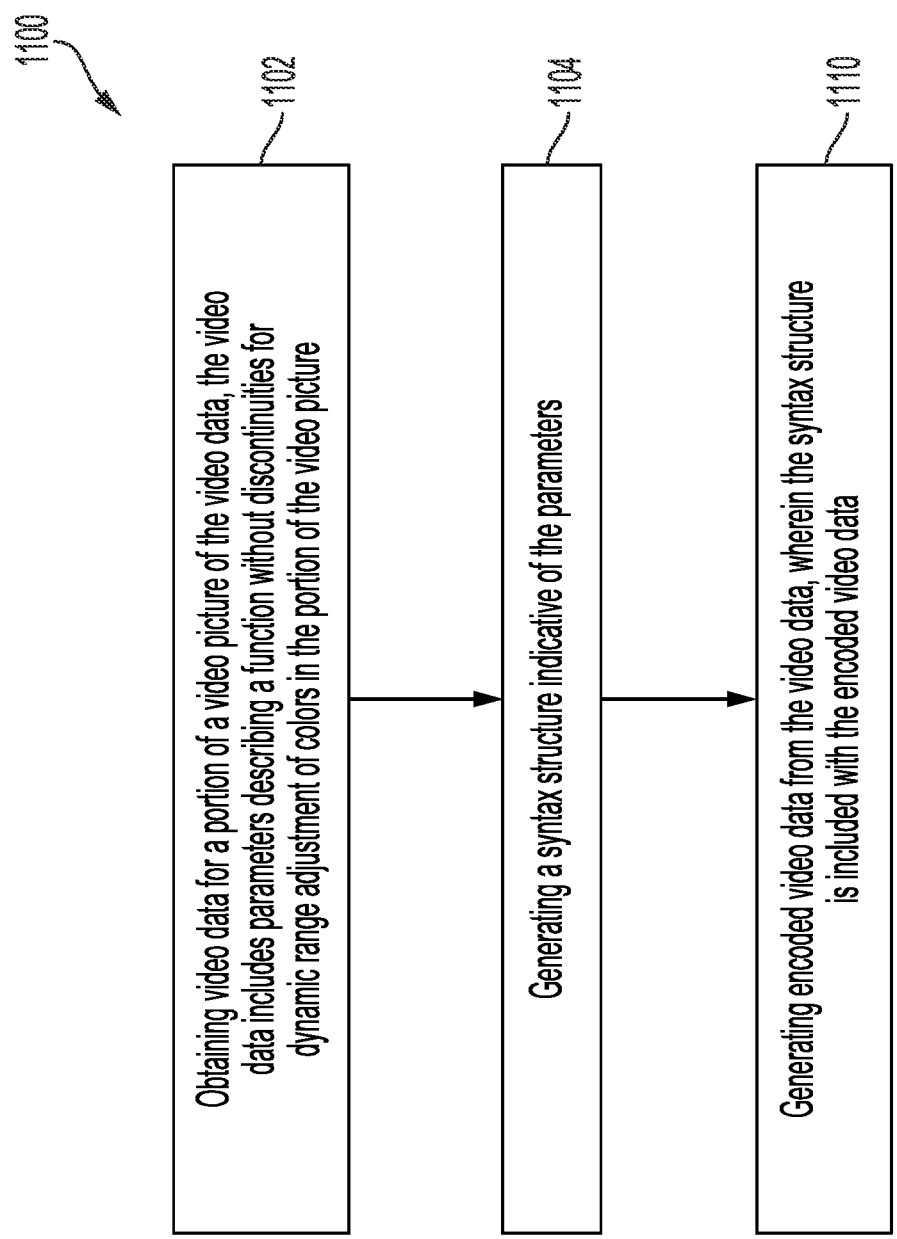
FIG. 11 includes a flowchart that illustrates an example of a process for encoding video data.

FIG. 11 includes a flowchart that illustrates an example of a process 1100 for encoding video data. The process 1100 can be implemented, for example, by an encoding device that includes a memory and a processor. In this example, the memory can be configured to store video data, and the processor can be configured to perform the steps of the process 1100 of FIG. 11. For example, the encoding device can include a non-transitory computer-readable medium that can store instructions that, when executed by the processor, can cause the processor to perform the steps of the process 1100. In some examples, the encoding device 104 can include a camera as the video source 102 for capturing video data.

At a block 1102, the method 1100 includes obtaining video data on the video encoding device 104 for a portion of a video picture of the video data. The video data includes parameters describing a function without discontinuities for dynamic range adjustment of colors in the portion of the video picture. The video data may be obtained by the encoding device 104 from the video source 102, including by capturing from a camera or from a storage for encoding or reencoding.

Next at a block 1104, the video encoding device 104 generates a syntax structure indicative of the parameters of the DRA function. Moving to a block 1110, the encoding device 104 generates encoded video data from the video data. The syntax structure is included with the encoded video data.

Figure 12:
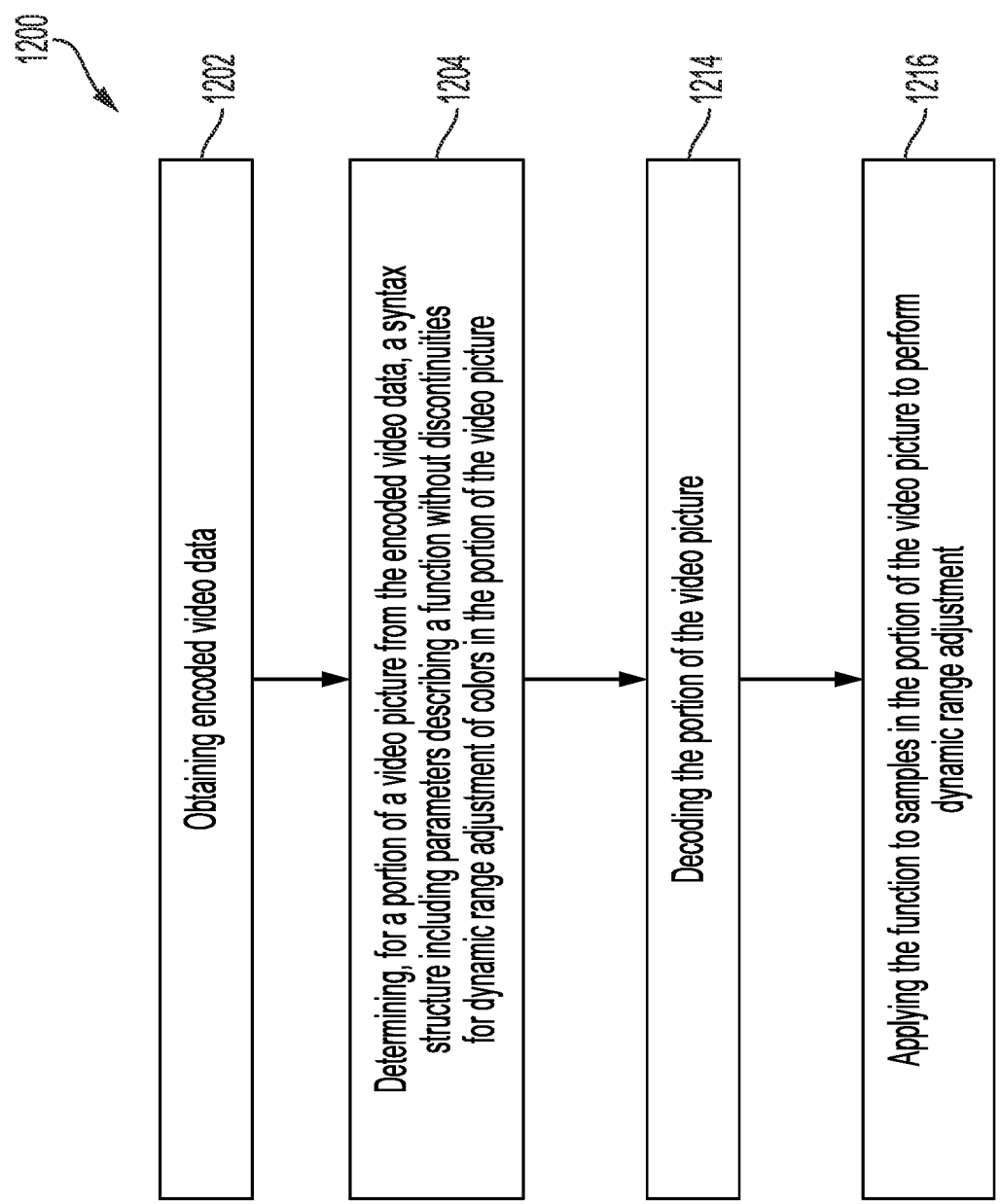
FIG. 12 includes a flowchart illustrating an example of a process for decoding video data.

FIG. 12 includes a flowchart illustrating an example of a process 1200 for decoding video data. The process 1200 can be implemented, for example, by a decoding device 112 that includes a memory and a processor. In this example, the memory can be configured to store encoded video data, and the processor can be configured to perform the steps of the process 1200 of FIG. 12. For example, the decoding device 112 can include a non-transitory computer-readable medium that can store instructions that, when executed by the processor, can cause the processor to perform the steps of the process 1200. In some examples, the decoding device 112 can include a camera for capturing video data. In some examples, the decoding device 112 may include the video destination device 122 such as a display for displaying decoded video data. In some examples, the decoding device 112 is a mobile device with a camera for capturing video data and a display for displaying the video data.

At a block 1102, the method 1200 includes obtaining video data on the video decoding device 112. The decoding device 112 may decode some or all of the video data from an encoded video bitstream, such as generated according to the method 1100. Some of the data may also be obtained from storage of the encoding device 112.

Next at a block 1214, the decoding device 112 determines, for a portion of a video picture from the encoded video data, a syntax structure including parameters describing a function without discontinuities for dynamic range adjustment of colors in the portion of the video picture. The function may include as input an integer quantization parameter. In one such embodiment, the function relates a value derived from the integer quantization parameter using a logarithmic function to a value associated with dynamic range adjustment of the portion of the video data.

Moving to a block 1214, the video decoding device 112 decodes the portion of the video picture based on data decoded from the video bitstream. At a block 1216, the video decoding device 112 applies the function to samples in the portion of the video picture to perform dynamic range adjustment.

Video encoding device 104 and video decoding device 112 may operate according to a video coding standard, such as ITU-T H.265, also referred to as High Efficiency Video Coding (HEVC) or extensions thereto, such as the multi-view and/or scalable video coding extensions. Alternatively, video encoding device 104 and video decoding device 112 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 3)," Joint Video Experts Team (JVET) of ITU-T SG 16 WP 3 and ISO/IEC JTC 1/SC 29/WG 11, 12$^{th}$ Meeting: Macao, CN, 3-12 Oct. 2018, JVET-L1001-v9 (hereinafter "VVC Draft 3). The techniques of this disclosure, however, are not limited to any particular coding standard. Embodiments, in particular, may include future versions of VVC that incorporate one or more embodiments disclosed herein.

In general, video encoding device 104 and video decoding device 112 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoding device 104 and video decoding device 112 may code video data represented in a YUV (e.g., Y, Cb, Cr) format. That is, rather than coding red, green, and blue (RGB) data for samples of a picture, video encoding device 104 and video decoding device 112 may code luminance and chrominance components, where the chrominance components may include both red hue and blue hue chrominance components. In some examples, video encoding device 104 converts received RGB formatted data to a YUV representation prior to encoding, and video decoding device 112 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoding device 104) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoding device 104 and video decoding device 112 may be configured to operate according to JEM or VVC. According to JEM or VVC, a video coder (such as video encoding device 104) partitions a picture into a plurality of coding tree units (CTUs). Video encoding device 104 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

Figure 13:
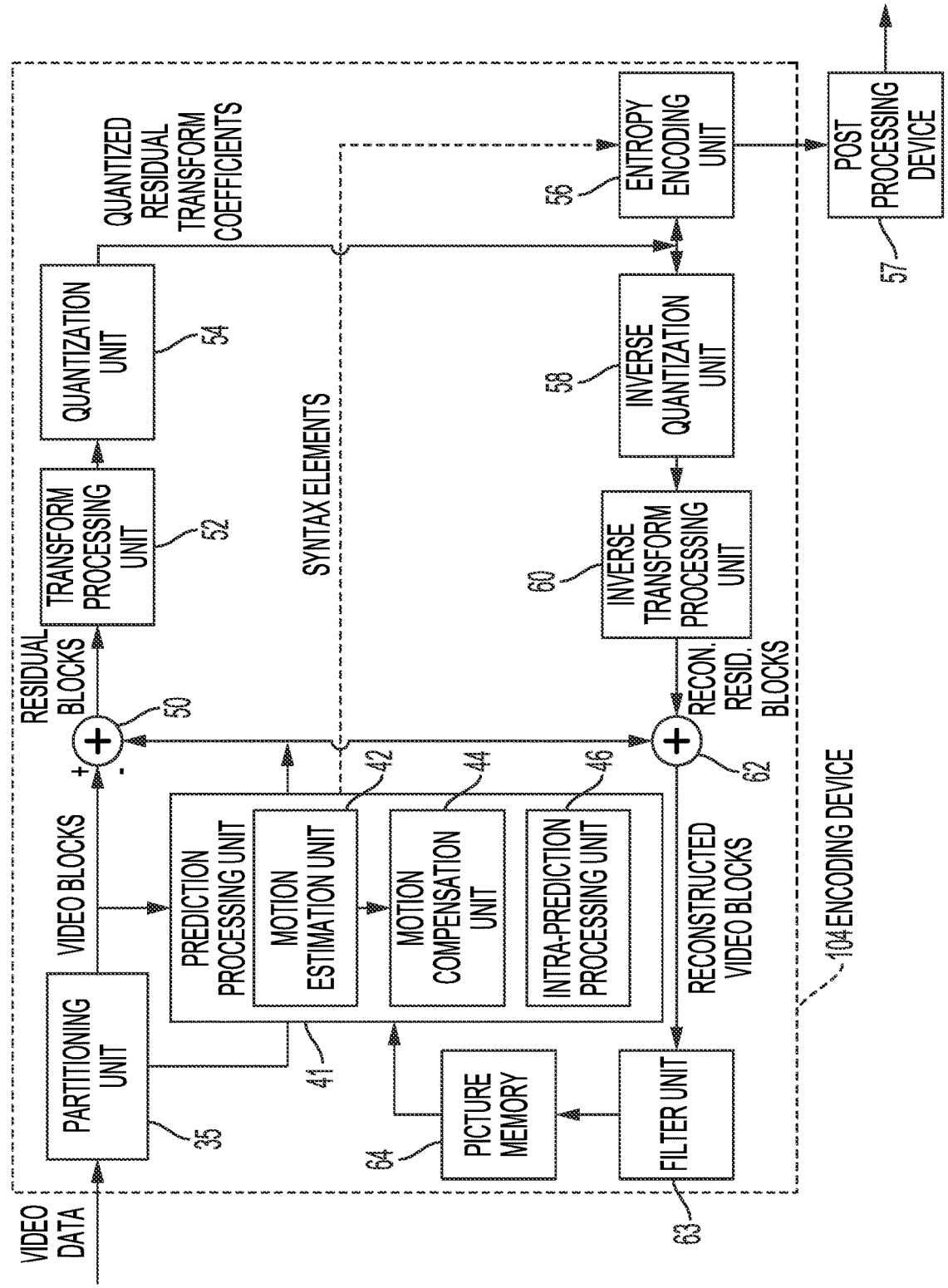
FIG. 13 is a block diagram illustrating an example encoding device.
Figure 14:
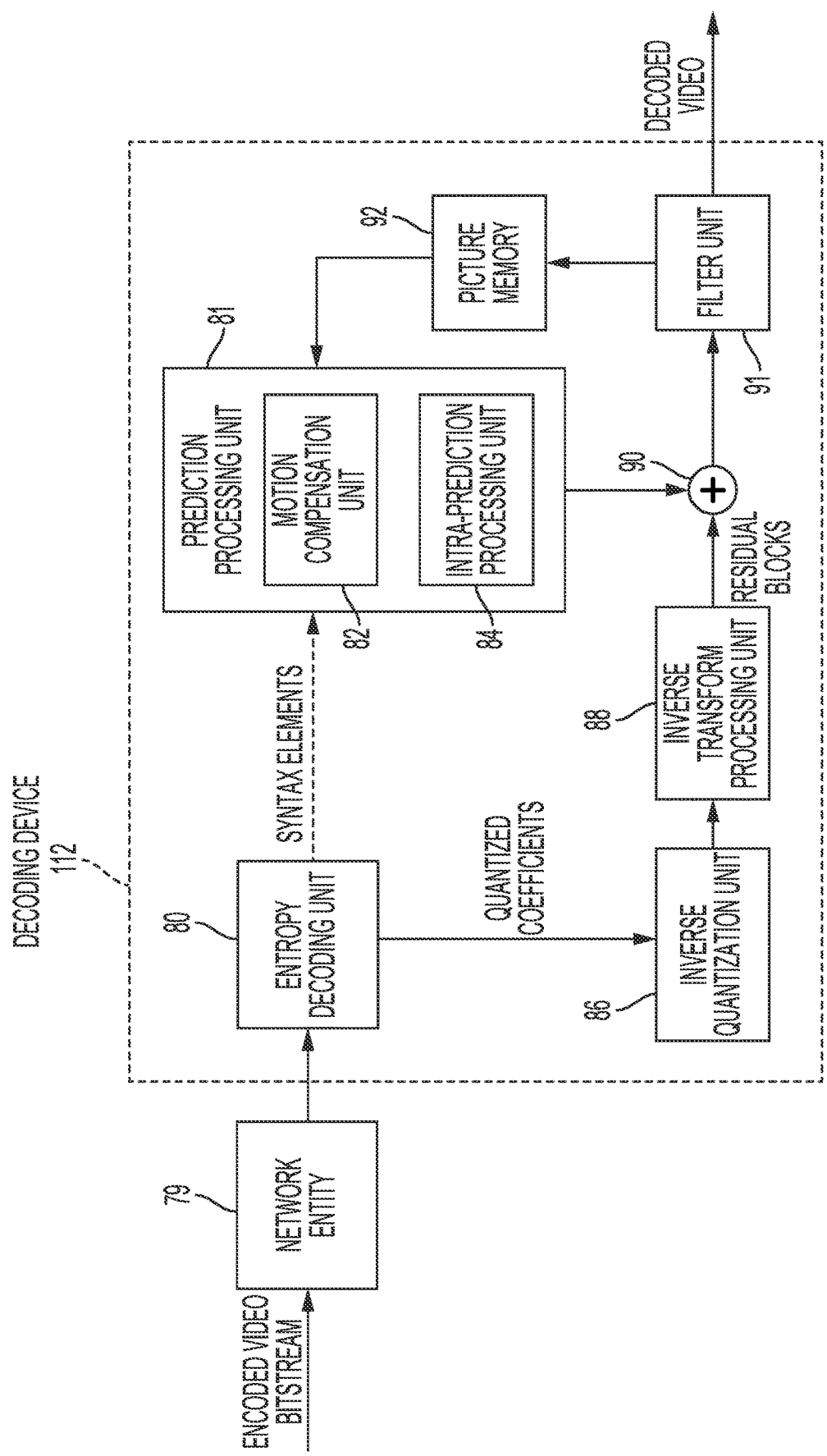
FIG. 14 is a block diagram illustrating an example decoding device.

As noted above, a source device can perform encoding, and thus an include an encoding device to perform this function. As also noted above, a destination device can perform decoding, and thus can include a decoding device. Example details of the encoding device 104 and the decoding device 112 of FIG. 1 are shown in FIG. 13 and FIG. 14, respectively. FIG. 13 is a block diagram illustrating an example encoding device 104 that may implement one or more of the techniques described in this disclosure. The encoding device 104 may, for example, generate the syntax structures described herein (e.g., the syntax structures of a VPS, SPS, PPS, or other syntax elements). The encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. The prediction processing unit 41 includes a motion estimation unit 42, a motion compensation unit 44, and an intra-prediction processing unit 46. For video block reconstruction, the encoding device 104 also includes an inverse quantization unit 58, an inverse transform processing unit 60, and a summer 62. The filter unit 63 is intended to represent one or more loop filters such as a deblocking filter, an adaptive loop filter (ALF), and a sample adaptive offset (SAO) filter. Although the filter unit 63 is shown in FIG. 13 as being an in-loop filter, in other configurations, the filter unit 63 may be implemented as a post-loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by the post processing device 57.

As shown in FIG. 13, the encoding device 104 receives video data, and the partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). The prediction processing unit 41 may select one of multiple possible coding modes, such as an intra-prediction coding modes or an inter-prediction coding modes, for the current video block, based on error results (e.g., coding rate and the level of distortion, or the like). The prediction processing unit 41 may provide the resulting intra- or inter-coded block to a first summer 50 to generate residual block data and to a second summer 62 to reconstruct the encoded block for use as a reference picture.

The intra-prediction processing unit 46 within the prediction processing unit 41 may perform intra-prediction coding of the current video block relative to one or more neighboring blocks in the same frame or slice as the current block to be coded to provide spatial compression. The motion estimation unit 42 and the motion compensation unit 44 within the prediction processing unit 41 perform inter-predictive coding of the current video block relative to one or more predictive blocks in one or more reference pictures to provide temporal compression.

The motion estimation unit 42 may be configured to determine the inter-prediction mode for a video slice according to a predetermined pattern for a video sequence. The predetermined pattern may designate video slices in the sequence as P slices, B slices, or Generalized P and B (GPB) slices (a slice that has identical reference picture lists, List 0 and List 1). The motion estimation unit 42 and the motion compensation unit 44 may be highly integrated, but are illustrated separately for conceptual purposes. Motion estimation, performed by the motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, the motion estimation unit 42 may perform a motion search relative to the full pixel positions and fractional pixel positions and output a motion vector with fractional pixel precision.

The motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in the picture memory 64. The motion estimation unit 42 sends the calculated motion vector to the entropy encoding unit 56 and the motion compensation unit 44.

Motion compensation, performed by the motion compensation unit 44, may involve fetching or generating the predictive block based on the motion vector determined by motion estimation, possibly performing interpolations to sub-pixel precision. Upon receiving the motion vector for the PU of the current video block, the motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. The summer 50 represents the component or components that perform this subtraction operation. The motion compensation unit 44 may also generate syntax elements associated with the video blocks and the video slice for use by the decoding device 112 in decoding the video blocks of the video slice.

The intra-prediction processing unit 46 may intra-predict a current block, as an alternative to the inter-prediction performed by the motion estimation unit 42 and the motion compensation unit 44, as described above. In particular, the intra-prediction processing unit 46 may determine an intra-prediction mode to use to encode a current block. In some examples, the intra-prediction processing unit 46 may encode a current block using various intra-prediction modes, e.g., during separate encoding passes, and the intra-prediction unit processing 46 may select an appropriate intra-prediction mode to use from the tested modes. For example, the intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. The intra-prediction processing unit 46 may calculate ratios from the distortions and rates for the various encoded blocks to determine which intra-prediction mode exhibits the best rate-distortion value for the block.

In any case, after selecting an intra-prediction mode for a block, the intra-prediction processing unit 46 may provide information indicative of the selected intra-prediction mode for the block to the entropy encoding unit 56. The entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include intra-prediction mode index tables and modified intra-prediction mode index tables (also referred to as codeword mapping tables).

After the prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to the transform processing unit 52. The transform processing unit 52 transforms the residual video data into residual transform coefficients using a transform, such as a discrete cosine transform (DCT) or a conceptually similar transform. The transform processing unit 52 may convert the residual video data from a pixel domain to a transform domain, such as a frequency domain.

The transform processing unit 52 may send the resulting transform coefficients to the quantization unit 54. The quantization unit 54 quantizes the transform coefficients to further reduce bit rate. The quantization process may reduce the bit depth associated with some or all of the coefficients. The degree of quantization may be modified by adjusting a quantization parameter. In some examples, the quantization unit 54 may then perform a scan of the matrix including the quantized transform coefficients. Alternatively or additionally, the entropy encoding unit 56 may perform the scan.

Following quantization, the entropy encoding unit 56 entropy encodes the quantized transform coefficients. For example, the entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by the entropy encoding unit 56, the encoded bitstream may be transmitted to the decoding device 112, or archived for later transmission or retrieval by the decoding device 112. The entropy encoding unit 56 may also entropy encode the motion vectors and the other syntax elements for the current video slice being coded.

The inverse quantization unit 58 and the inverse transform processing unit 60 apply inverse quantization and inverse transformation, respectively, to reconstruct the residual block in the pixel domain for later use as a reference block of a reference picture. The motion compensation unit 44 may calculate a reference block by adding the residual block to a predictive block of one of the reference pictures within a reference picture list. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reference block for storage in the picture memory 64. The reference block may be used by the motion estimation unit 42 and the motion compensation unit 44 as a reference block to inter-predict a block in a subsequent video frame or picture.

In this manner, the encoding device 104 of FIG. 13 represents an example of a video encoder configured to generate syntax for an encoded video bitstream. The encoding device 104 may, for example, generate a data structure that includes parameters of a piecewise linear function, as described above. The encoding device 104 may perform any of the techniques described herein, including the processes described above with respect to FIGS. 11 and 12. The techniques of this disclosure have generally been described with respect to the encoding device 104, but as mentioned above, some of the techniques of this disclosure may also be implemented by the post processing device 57. Furthermore, devices other than the example encoding device 104, having similar or different components, can be used to perform the techniques described herein.

FIG. 14 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. The prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 13.

During the decoding process, the decoding device 112 receives an encoded video bitstream that represents video blocks of an encoded video slice and associated syntax elements sent by the encoding device 104. In some examples, the decoding device 112 may receive the encoded video bitstream from the encoding device 104. In some examples, the decoding device 112 may receive the encoded video bitstream from a network entity 79, such as a server, a media-aware network element (MANE), a video editor/splicer, or other such device configured to implement one or more of the techniques described above. The network entity 79 may or may not include the encoding device 104. Some of the techniques described in this disclosure may be implemented by the network entity 79 prior to the network entity 79 transmitting the encoded video bitstream to the decoding device 112. In some video decoding systems, the network entity 79 and the decoding device 112 may be parts of separate devices, while in other instances, the functionality described with respect to the network entity 79 may be performed by the same device that includes the decoding device 112.

The entropy decoding unit 80 of the decoding device 112 entropy decodes the bitstream to generate quantized coefficients, motion vectors, and other syntax elements. The entropy decoding unit 80 forwards the motion vectors and other syntax elements to the prediction processing unit 81. The decoding device 112 may receive the syntax elements at the video slice level and/or the video block level. The entropy decoding unit 80 may process and parse both fixed-length syntax elements and variable-length syntax elements in or more parameter sets, such as a VPS, SPS, and PPS.

When the video slice is coded as an intra-coded (I) slice, the intra prediction processing unit 84 of the prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, the motion compensation unit 82 of the prediction processing unit 81 produces predictive blocks for a video block of the current video slice based on the motion vectors and other syntax elements received from the entropy decoding unit 80. The predictive blocks may be produced from one of the reference pictures within a reference picture list. The decoding device 112 may construct the reference frame lists, List 0 and List 1, using default construction techniques based on reference pictures stored in the picture memory 92.

The motion compensation unit 82 determines prediction information for a video block of the current video slice by parsing the motion vectors and other syntax elements, and uses the prediction information to produce the predictive blocks for the current video block being decoded. For example, the motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

The motion compensation unit 82 may also perform interpolation based on interpolation filters. The motion compensation unit 82 may use interpolation filters as used by the encoding device 104 during encoding of the video blocks to calculate interpolated values for sub-integer pixels of reference blocks. In this case, the motion compensation unit 82 may determine the interpolation filters used by the encoding device 104 from the received syntax elements, and may use the interpolation filters to produce predictive blocks.

The inverse quantization unit 86 inverse quantizes, or de-quantizes, the quantized transform coefficients provided in the bitstream and decoded by the entropy decoding unit 80. The inverse quantization process may include use of a quantization parameter calculated by the encoding device 104 for each video block in the video slice to determine a degree of quantization and, likewise, a degree of inverse quantization that should be applied. The inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After the motion compensation unit 82 generates the predictive block for the current video block based on the motion vectors and other syntax elements, the decoding device 112 forms a decoded video block by summing the residual blocks from the inverse transform processing unit 88 with the corresponding predictive blocks generated by the motion compensation unit 82. The summer 90 represents the component or components that perform this summation operation. If desired, loop filters (either in the coding loop or after the coding loop) may also be used to smooth pixel transitions, or to otherwise improve the video quality. A filter unit 91 is intended to represent one or more loop filters such as a deblocking filter, an adaptive loop filter (ALF), and a sample adaptive offset (SAO) filter. Although the filter unit 91 is shown in FIG. 14 as being an in-loop filter, in other configurations, the filter unit 91 may be implemented as a post-loop filter. The decoded video blocks in a given frame or picture are then stored in the picture memory 92, which stores reference pictures used for subsequent motion compensation. The picture memory 92 also stores decoded video for later presentation on a display device, such as the video destination device 122 shown in FIG. 1.

The decoding device 112 of FIG. 14 represents an example of a video decoder configured to parse the syntax of an encoded video bitstream, and approximately reproduce the original video data for subsequent display. The decoding device may, for example, parse a data structure that includes parameters of a piecewise linear function, and apply the piecewise linear function to decoded data to perform Dynamic Range Adjustment, as discussed above. The decoding device 112 may perform any of techniques discussed herein, including the processes described above with respect to FIGS. 11 and 12. Additionally, devices other than the example decoding device 112, which have similar or different components, can be used to perform the techniques described herein. In some embodiments, the DRA is performed subsequent to the picture being stored in the picture memory 64 of FIG. 13 or 92 of FIG. 14. In other embodiments, the picture samples with DRA adjustment applied is placed in the picture memory 64 of FIG. 13 or 92 of FIG. 14.

Certain aspects and embodiments of this disclosure are disclosed above. It is to be recognized that some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive. In particular, this description provides examples only, and is not intended to limit the scope, applicability, or configuration of the disclosure. Rather, the description of the examples will provide those skilled in the art with an enabling description for implementing an example. It should be understood that various changes may be made in the function and arrangement of elements without departing from the spirit and scope of the application as set forth in the appended claims.

Specific details are given in the above description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality. As used herein, "coding" can refer to "encoding" and "decoding," particularly when the encoding and decoding processes operate in a similar manner (e.g., encoding and decoding may both include applying a transform with the encoding processing applying a transform and the decoding processing applying an inverse transform).

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described examples may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in other embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium that includes program code including instructions that, when executed, performs one or more of the methods described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of encoding video data, comprising:
obtaining, at an encoding device, video data, wherein, for a portion of a video picture of the video data, obtaining video data for a portion of a video picture of the video data comprises obtaining parameters describing a function of a quantization parameter that is without discontinuities, the function being for dynamic range adjustment of samples in the portion of the video frame, and the quantization factor being associated with quantizing transform coefficients used to encode the portion of the picture;
generating a syntax structure indicative of the parameters, the parameters describing the function for dynamic range adjustment of the samples; and
generating encoded video data indicative of the samples in the portion of the video frame from the video data, wherein the syntax structure is included with the encoded video data.

2. The method of claim 1, wherein the function of the quantization factor comprises a logarithmic function of a value derived from the quantization factor.

3. The method of claim 1, wherein the syntax structure is generated to be associated with a sequence of video pictures or the video picture of a sequence of video pictures.

4. The method of claim 1, wherein the syntax structure comprises syntax elements indicative of parameters of the function.

5. The method of claim 4, wherein the syntax structure comprises syntax elements indicative of a parameters defining a one-dimensional function.

6. The method of claim 1, wherein the syntax structure is indicative of one or more of the position of the video picture in a sequence of video pictures, an intra-period, a random access period, or of a sequence of pictures and wherein obtaining the parameters describing the function comprises determining the parameters based on one or more of the position of the video picture in a sequence of video pictures, the intra-period, the random access period, or the sequence of pictures.

7. The method of claim 1, further comprising generating a second syntax structure indicative of parameters of a second parametric function indicative of a chroma dynamic range adjustment (DRA) scale correction term.

8. The method of claim 7, wherein the second parametric function is a function of the quantization parameter (QP) associated with a luma component of the portion of the video picture and a function of offsets associated with the luma component and one or more chroma components of the portion of the video picture.

9. A method of decoding video data, comprising:
determining, from an encoded video bitstream comprising encoded video data, for a portion of a video picture from the encoded video data, a syntax structure including parameters describing a function of a quantization factor, the function being without discontinuities for dynamic range adjustment of colors in the portion of the video picture and wherein the quantization factor is associated with quantizing transform coefficients used to encode the portion of the video picture;
decoding samples in the portion of the video picture; and
applying the function to the samples in the portion of the video picture to perform dynamic range adjustment of the samples.

10. The method of claim 9, wherein the function of the quantization factor comprises a logarithmic function of a value derived from the quantization factor.

11. The method of claim 9, further comprising decoding, from the encoded video data, data associating the syntax with a sequence of video pictures or the video picture of a sequence of video pictures.

12. The method of claim 9, wherein the syntax structure comprises syntax elements indicative of parameters of the function.

13. The method of claim 12, wherein the syntax structure comprises syntax elements indicative of a parameters defining a one-dimensional function.

14. The method of claim 9, wherein the syntax structure is indicative of one or more of the position of the video picture in a sequence of video pictures, an intra-period, a random access period, or of a sequence of pictures and wherein determining the parameters describing the function comprises determining the parameters based on one or more of the position of the video picture in a sequence of video pictures, the intra-period, the random access period, or the sequence of pictures.

15. The method of claim 9, further comprising decoding a second syntax structure from the encoded video bitstream indicative of parameters of a second parametric function indicative of a chroma dynamic range adjustment (DRA) scale correction term and applying the second parametric function to the samples.

16. The method of claim 15, wherein the second parametric function is a function of the quantization parameter (QP) associated with a luma component of the portion of the video picture and a function of offsets associated with the luma component and one or more chroma components of the portion of the video picture.

17. An apparatus for decoding video data, comprising:
a memory configured to store at least a portion of a video picture; and
a video processor configured to:
determine, from an encoded video bitstream comprising encoded video data, for the portion of the video picture from the encoded video data, a syntax structure including parameters describing a function of a quantization factor, the function being without discontinuities for dynamic range adjustment of colors in the portion of the video picture and wherein the quantization factor is associated with quantizing transform coefficients used to encode the portion of the video picture;
decode samples in the portion of the video picture using the encoded video data; and
apply the function to the samples in the portion of the video picture to perform dynamic range adjustment of the samples.

18. The apparatus of claim 17, wherein the function of the quantization factor comprises a logarithmic function of a value derived from the quantization factor.

19. The apparatus of claim 17, wherein the processor is further configured to decode, from the encoded video data, data associating the syntax with a sequence of video pictures or the video picture of a sequence of video pictures.

20. The apparatus of claim 17, wherein the syntax structure comprises syntax elements indicative of parameters of the function.

21. The apparatus of claim 20, wherein the syntax structure comprises syntax elements indicative of a parameters defining a one-dimensional function.

* * * * *